United States Patent
Levy et al.

(10) Patent No.: US 10,713,201 B2
(45) Date of Patent: Jul. 14, 2020

(54) APPARATUS, SYSTEM AND METHOD OF COMMUNICATING OVER A MEDIA AGNOSTIC (MA) USB CONNECTION

(71) Applicant: INTEL IP CORPORATION, Santa Clara, CA (US)

(72) Inventors: Elad Levy, Rishon LeZion (IL); Michael Glik, Kfar Saba (IL); Rafal Wielicki, Gdansk (PL); Bahareh Sadeghi, Portland, OR (US); Avishai Ziv, Gedera (IL)

(73) Assignee: INTEL IP CORPORATION, Santa Clara, CA (US)

( * ) Notice: Subject to any disclaimer, the term of this patent is extended or adjusted under 35 U.S.C. 154(b) by 36 days.

(21) Appl. No.: 16/121,974

(22) Filed: Sep. 5, 2018

(65) Prior Publication Data

US 2019/0050358 A1 Feb. 14, 2019

Related U.S. Application Data

(60) Provisional application No. 62/558,501, filed on Sep. 14, 2017.

(51) Int. Cl.
| | |
|---|---|
| *G06F 13/38* | (2006.01) |
| *G06F 13/10* | (2006.01) |
| *G06F 11/22* | (2006.01) |
| *G06F 13/42* | (2006.01) |

(52) U.S. Cl.
CPC .......... *G06F 13/385* (2013.01); *G06F 11/221* (2013.01); *G06F 13/102* (2013.01); *G06F 13/4295* (2013.01); *G06F 2213/0042* (2013.01)

(58) Field of Classification Search
CPC ..... G06F 13/285; G06F 13/102; G06F 13/385
See application file for complete search history.

(56) References Cited

U.S. PATENT DOCUMENTS

| | | | | |
|---|---|---|---|---|
| 8,090,857 | B2 * | 1/2012 | Yonge, III | ............ H04L 1/0061 |
| | | | | 370/469 |
| 2015/0350159 | A1 * | 12/2015 | Verma | ................. H04L 43/0888 |
| | | | | 370/329 |
| 2016/0301620 | A1 * | 10/2016 | Verma | ............... H04W 72/0446 |

OTHER PUBLICATIONS

Media Agnostic Universal Serial Bus Specification, Release 1.0a, Jul. 29, 2015, 176 pages.
WiGig Serial Extension Specification, Version 1.2, Jul. 2013, Final Specification, 138 pages.

(Continued)

*Primary Examiner* — Zachary K Huson
(74) *Attorney, Agent, or Firm* — Shichrur & Co.

(57) ABSTRACT

For example, an MA USB host of an MA USB PAL may be configured to process a request message from a USBDI of a USB host for a real time data transfer to be delivered between the USB host and a USB device EP; based on the request message, transmit at least one real time transfer request to an MA USB device of the MA USB PAL, a header of the real time transfer request including a request ID field to identify the real time data transfer, and a delivery time field to indicate a delivery time to complete delivery of the real time data transfer; and, based on a determination that the real time data transfer is not to be completed by the delivery time, send a response to the USBDI, the response including an error indication to indicate failure of the real time data transfer.

25 Claims, 8 Drawing Sheets

(56) References Cited

OTHER PUBLICATIONS

Universal Serial Bus 3.0 Specification, (including errata and ECNs through May 1, 2011) , Hewlett-Packard Company, Intel Corporation, Microsoft Corporation, NEC Corporation, ST-Ericsson, Texas Instruments, Revision 1.0, Jun. 6, 2011, 531 pages.
Universal Serial Bus (USB) Mass Storage Class Bulk-Only Transport, Revision 1.0 , Sep. 31, 1999, 22 pages.
IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
Wireless Gigabit Alliance, WiGig MAC and PHY Specification, Version 1.1, Apr. 2011, Final specification, 442 pages.
Wireless Gigabit Alliance, WiGig Bus Extension Specification, Version 1.0, Jun. 2011, Final specification, 102 pages.

* cited by examiner

| | 31 30 29 28 27 26 25 24 23 22 21 20 19 18 17 16 | 15 14 13 12 11 10 9 8 | 7 6 5 4 | 3 2 1 0 | |
|---|---|---|---|---|---|
| | Length | Type / Subtype | Flags | Version | DWORD 0 |
| | Device Address | EP Handle | | | DWORD 1 |
| | StreamID | T-Flags / EPS | Status Code | | DWORD 2 |
| 512 / | Request ID | | | | DWORD 3 |
| 510 / | 514 — Sequence Number | | | | |
| | Remaining Size | | | | DWORD 4 |
| 506 / | R-flags / 508 — Budget (optionally included) | Delivery Time | | | DWORD 5 |
| 504 / | MA USB Timestamp (optionally present in RealtimeTransferResp packets) | | | | DWORD 6 |
| 502 / | Media Time/Transmission Delay (optionally present in RealtimeTransferResp packets) | | | | DWORD 7 |

500 ↗

Fig. 5

APPARATUS, SYSTEM AND METHOD OF COMMUNICATING OVER A MEDIA AGNOSTIC (MA) USB CONNECTION

CROSS REFERENCE

This application claims the benefit of and priority from U.S. Provisional Patent Application No. 62/558,501 entitled "Apparatus, System and Method of Communicating over a Media Agnostic (MA) USB Connection", filed Sep. 14, 2017, the entire disclosures of which is incorporated herein by reference.

TECHNICAL FIELD

Embodiments described herein generally relate to communicating over a Media-Agnostic (MA) USB connection.

BACKGROUND

Some wireless communication technologies may be configured for communication of various dedicated services.

Since Universal Serial Bus (USB) devices and/or USB hosts may be configured for communicating over a physical medium, e.g., a USB cable, there may be a problem to perform some operations, e.g., in an efficient seamless and/or transparent manner, via a wireless medium.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 5 is a schematic illustration of a format of packet headers, in accordance with some demonstrative embodiments.

DETAILED DESCRIPTION

Figure 1:
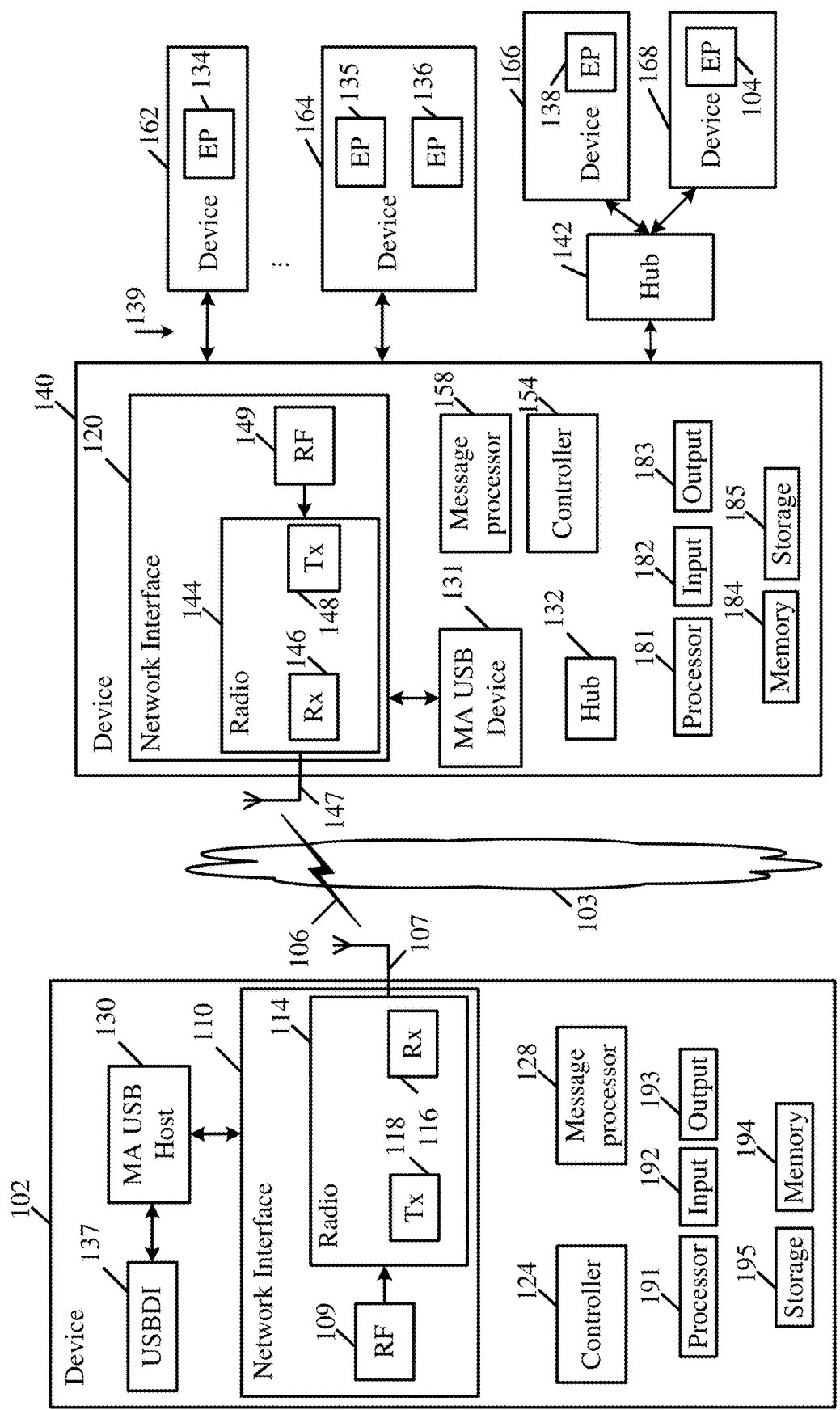
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Media Agnostic (MA) Universal Serial Bus (USB) specifications (*Media Agnostic Universal Serial Bus Specification, Release 1.0a*, Jul. 29, 2015) and/or future versions and/or derivatives thereof, devices and/or networks operating in accordance with existing Wireless-Gigabit-Alliance (WGA or WiGig) specifications (*Wireless Gigabit Alliance, Inc WiGig MAC and PHY Specification Version 1.1, April 2011, Final specification*) and/or future versions and/or derivatives thereof, devices and/or networks operating in accordance with existing WiGig Serial Extension (WSE) protocols (*WiGig Serial Extension (WSE) Specification*

*Draft* 1.02, August 2012) and/or future versions and/or derivatives thereof, devices and/or networks operating in accordance with existing WiGig Display Extension (WDE) protocols (*WDE Draft Specification* 1.04, August 2012) and/or future versions and/or derivatives thereof, devices and/or networks operating in accordance with existing WiGig Bus Extension (WBE) protocols (*WiGig Bus Extension Spec (WBE), Version* 1.0 June 2011) and/or future versions and/or derivatives thereof, devices and/or networks operating in accordance with existing WiGig Secure Digital (SD) Extension (WSD) protocols (*WiGig SD Extension (WSD) PAL Specification Draft* 1.0 August 2012) and/or future versions and/or derivatives thereof, devices and/or networks operating in accordance with existing USB Protocols (including USB 2.0, USB 3.0 (*Universal Serial Bus 3.0 Specification,* 2011) and/or future versions and/or derivatives thereof, devices and/or networks operating in accordance with existing Bulk Only Transfer (BOT) Protocols (*Universal Serial Bus (USB) Mass Storage Class Bulk-Only Transport, Revision* 1.0, Sep. 31, 1999) and/or future versions and/or derivatives thereof, devices and/or networks operating in accordance with existing WiFi Serial Bus (WSB) specifications and/or future versions and/or derivatives thereof, devices and/or networks operating in accordance with existing IEEE 802.11 standards (including *IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications,* Dec. 7, 2016)) and/or future versions and/or derivatives thereof, devices and/or networks operating in accordance with existing WiFi Alliance (WFA) Specifications (including *Wi-Fi Neighbor Awareness Networking (NAN) Technical Specification, Version* 1.0, May 1, 2015) and/or future versions and/or derivatives thereof, devices and/or networks operating in accordance with existing WFA Peer-to-Peer (P2P) specifications (*WiFi P2P technical specification, version* 1.5, Aug. 4, 2015) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011*, Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "peer to peer (PTP or P2P) communication", as used herein, may relate to device-to-device communication over a link ("peer-to-peer link") between a pair of devices. The P2P communication may include, for example, communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to device communication.

The phrase "Protocol Adaptation Layer (PAL)", as used herein, may include an abstraction layer configured to enable transporting traffic of at least one predefined protocol over a communication link. The predefined protocol may include, for example, a specific industry standard protocol, e.g. USB, DisplayPort, and the like. The PAL may be above a layer of the communication link. For example, the PAL may be above a data link layer, for example, a MAC layer, and/or above a transport layer, e.g., a Transmission Control Protocol (TCP) or User Datagram Protocol (UDP), which is above the data link layer.

In one example, the data link layer may include, for example, a MAC layer of a wireless link, e.g., a WiFi MAC layer, a WiGig MAC layer, a P2P MAC layer, and the like. In another example, the PAL may be above a transport layer, e.g., a TCP or UDP, which may be configured for transporting traffic over an IP network, e.g., a wired or wireless Internet link and/or Ethernet link.

Some demonstrative embodiment are described herein with respect to a PAL connection over a wireless communication link, for example, a WiFi link or a mmWave link, e.g., as described below. However, other embodiments may include a PAL connection over any other wired or wireless communication link, e.g., an IP link.

The phrase "PAL communication unit", as used herein, may include a communication element to manage a PAL connection between a first architectural element, for example, a PAL host, e.g., a USB host, and a second architectural element, for example, a PAL device, e.g., a USB device, over a communication link, e.g., a MAC layer link or a transport layer link, between the PAL communication unit and another PAL communication unit. For example, a first PAL communication unit may communicate PAL traffic with a second PAL communication unit over a communication link. The PAL traffic may include traffic of a PAL connection, over a PAL, between first and second devices, e.g., a host device and a USB device.

In some demonstrative embodiments, the PAL communication unit (also referred to as "PAL manager" or "PAL controller") may operate as, perform a role of, perform one or more operations of, and/or perform one or more functionalities of, may include, and/or may be implemented as part of, a service set, for example, a WSE Service Set (WSS) or a Media-Agnostic (MA) USB Service Set (MASS). For example, the PAL communication unit may operate as, perform a role of, perform one or more operations of, and/or perform one or more functionalities of, a MA-USB device, a WSE device, a MA-USB host or a WSE host, e.g., as described below. In other embodiments, the PAL communication unit may operate as, perform a role of, perform one or more operations of, and/or perform one or more functionalities of, any other PAL device, element and/or module.

In some demonstrative embodiments, the phrase "MA USB", as used herein, may include a PAL, which may manage communication of USB payload via an MA link interface. The MA USB PAL may include any other additional or alternative functionality.

The phrases "MA-USB device" and "WSE device", as used herein, may include, for example, a MA-USB or WSE architectural element that integrates, and/or is associated with, at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/or any other technologies. For example, the integrated device may be presented through the MA-USB device or WSE device to a host as a USB device compliant with a *USB Specification*, e.g., the *USB 2.0 and/or USB 3.0 Specifications*.

In one example, the MA-USB device may optionally include any computing platform, e.g., a portable device, which houses and/or performs the functionality of the MA-USB device and, optionally, one or more additional elements, e.g., drivers and/or application software, configured to perform the functionality of a peripheral device. In other embodiments, the MA USB device may include and/or may be implemented by any other portable or non-portable device.

In some demonstrative embodiments, the MA-USB device may include USB device logic, e.g., for communicating with a USB device according to a *USB Specification*, a MA-USB device PAL, e.g., to control communication over the PAL, and a network interface, for example, an MA link interface, e.g., to communicate over the communication link. For example, the MA-USB device PAL may interface between the USB device logic and the network interface, e.g., in a transparent manner.

In other embodiments, the MA-USB device may include any other elements. In one example, the PAL communication unit may perform the functionality of at least the MA-USB device PAL.

The phrases "MA-USB host" and "WSE host", as used herein, may include an architectural element of the MA-USB PAL or WSE PAL that includes a communication architecture, e.g., WiFi MAC and PHY, and USB host logic, e.g., as defined by a *USB specification*, e.g., the *USB 2.0 and/or USB 3.0 Specifications*.

In one example, the MA-USB host or WSE host may optionally include any computing platform, e.g., a personal computer, which houses and/or performs the functionality of the MA-USB host or WSE host and, optionally, one or more additional elements, e.g., drivers and/or application software, configured to perform the functionality of a host device. In other embodiments, the MA-USB host or WSE host may include and/or may be implemented by any other portable or non-portable device.

In some demonstrative embodiments, the MA-USB host may include USB host logic, e.g., for communicating with a USB host according to a USB Specification, a MA-USB host PAL, e.g., to control communication over the PAL, and a network interface, for example, an MA link interface, e.g., to communicate over the communication link. For example, the MA-USB host PAL may interface between the USB host logic and the network interface, e.g., in a transparent manner. In other embodiments, the MA-USB host may include any other elements. In one example, the PAL communication unit may perform the functionality of at least the MA-USB host PAL.

An endpoint may include, for example, an architectural element, which is associated with a first device, which in turn is configured to interface between the endpoint and a second device over a communication link. For example, the endpoint may be integrated as part of the first device or connected to the first device via one or more other devices and/or connections.

The endpoint may be implemented, for example, using any technology, e.g., software, hardware and/or any combination thereof. The first device may include and/or interface between one or more endpoints and the second device.

In one example, the first device may include a MA-USB device and the second device may include a MA-USB host. For example, the endpoint may belong to a USB device, e.g., a USB device, which may be integrated into the MA-USB device or connected, e.g., through a wired USB connection, to the MA-USB device, e.g., via a hub integrated into the MA-USB device.

According to this example, the endpoint may be uniquely identified by the MA-USB host. For example, a combination of a MA-USB device address of the MA-USB device and a MA-USB EP handle assigned to the endpoint may uniquely identify a USB device endpoint within a MA-USB service set.

In other examples, the first and second devices may include any other, e.g., non-MAUSB, non-WSE and/or non-USB, device and the endpoint may perform the functionality of any other, e.g., non-USB, non-MA-USB and/or non-WSE, element.

Some demonstrative embodiments are described herein with respect to wireless communication. However, other embodiments may be implemented with respect to any other wired and/or wireless communication scheme, network, standard and/or protocol.

Reference is made to FIG. 1, which schematically illustrates a system 100, in accordance with some demonstrative embodiments.

As shown in FIG. 1, in some demonstrative embodiments, system 100 may include one or more communication devices. For example, system 100 may include a first communication device 102, and/or a second communication device 140. In some demonstrative embodiments, devices 102 and/or 140 may include wireless communication devices, e.g., as described below. In other embodiments, devices 102 and/or 140 may include any other type of communication devices.

In some demonstrative embodiments, devices 102 and/or 140 may include a mobile device or a non-mobile, e.g., a static, device. For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include and/or perform the functionality of one or more STAs. For example, device 102 may include at least one STA, and/or device 140 may include at least one STA.

In some demonstrative embodiments, devices 102 and/or 140 may include and/or perform the functionality of one or more WLAN STAs.

In some demonstrative embodiments, devices 102 and/or 140 may include and/or perform the functionality of one or more Wi-Fi STAs.

In some demonstrative embodiments, devices 102 and/or 140 may include and/or perform the functionality of one or more BT devices.

In some demonstrative embodiments, devices 102 and/or 140 may include and/or perform the functionality of one or more Neighbor Awareness Networking (NAN) STAs.

In some demonstrative embodiments, devices 102 and/or 140 may include and/or perform the functionality of any other devices and/or STAs.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable additional or alternative hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 may include, for example, network interface 110 configured to communicate with device 140, and/or one or more other devices; and/or device 140 may include, for example, network interface 120, configured to communicate with device 102, and/or one or more other devices, e.g., as described below.

In some demonstrative embodiments, network interfaces 110 and/or 120 may include any suitable communication unit, e.g., a wired and/or wireless communication unit, to communicate over the communication network.

For example, network interfaces 110 and/or 120 may be configured to perform at least part of the functionality of an MA link Interface, e.g., as described below.

In some demonstrative embodiments, devices 102 and 140 may establish a communication link 106. For example, link 106 may be configured for communication over a data link layer, e.g., the MAC layer, a logical link control (LLC) and/or a transport layer.

In some demonstrative embodiments, link 106 may include an uplink and/or a downlink. For example, the uplink may include a link for communicating data from device 140 to device 102, and/or the downlink may include a link for communicating data from device 102 to device 140.

In one example, the downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, link 106 may include a Media Agnostic (MA) link, for example, a wireless communication link, e.g., a WiFi link or a WLAN link, e.g., as described below.

In other embodiments, link 106 may include any other wireless or wired link, e.g., an IP link.

In some demonstrative embodiments, devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a channel over a 2.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (S1G) frequency band, and/or any other channel over any other band.

In some demonstrative embodiments, devices 102 and/or 140 may form, and/or communicate as part of, a wireless local area network (WLAN).

In some demonstrative embodiments, devices 102 and/or 140 may form, and/or communicate as part of, a WiFi network.

In some demonstrative embodiments, devices 102 and/or 140 may form, and/or communicate as part of, a WiFi Direct (WFD) network, e.g., a WiFi direct services (WFDS) network, and/or may perform the functionality of one or more WFD devices.

In some demonstrative embodiments, devices 102 and/or 140 may communicate as part of a P2P network or any other network.

In some demonstrative embodiments, devices 102 and/or 140 may perform the functionality of DMG stations ("DMG STA"). For example, communication devices 102 and/or 140 may be configured to communicate over the DMG band.

In other embodiments, wireless communication devices 102 and/or 140 may form, and/or communicate as part of, any other network and/or perform the functionality of any other wireless devices or stations.

In some demonstrative embodiments, devices 102 and/or 140 may include one or more radios including circuitry and/or logic to perform wireless communication between devices 102, 140 and/or one or more other wireless communication devices, e.g., over wireless medium 103.

In some demonstrative embodiments, device 102 may include a radio 114 to communicate with device 140 over a wireless channel, and/or device 140 may include a radio 144 to communicate with device 102 over the wireless channel.

For example, radios 114 and/or 144 may be configured to communicate over a WLAN link, a WiFi link, a Point to Point (PTP) link, a WiFi Direct (WFD) link, a Wireless Gigabit (WiGig) link, or any other link.

In some demonstrative embodiments, radios 114 and/or 144 may include one or more wireless receivers (Rx) including circuitry and/or logic to receive and/or process wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to process and/or send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a device, e.g., device 102, and/or an MA USB host, e.g., an MA USB host implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a device, e.g., device 140, and/or an MA USB device, e.g., an MA USB device implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 14 may be implemented as part of network interface 119, and/or at least part of the functionality of controller 154 may be implemented as part of network interface 120.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of network interface 110, and/or at least part of the functionality of message processor 158 may be implemented as part of network interface 120.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of network interface 110. For example, the chip or SoC may include one or more elements of controller 124, one or more elements of message processor 128, and/or one or more elements of network interface 110. In one example, controller 124, message processor 128, and network interface 110 may be implemented as part of the chip or SoC.

In other embodiments, controller 124, message processor 128 and/or network interface 110 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of network interface 120. For example, the chip or SoC may include one or more elements of controller 154, one or more elements of message processor 158, and/or one or more elements of network interface 120. In one example, controller 154, message processor 158, and network interface 120 may be implemented as part of the chip or SoC.

In other embodiments, controller 154, message processor 158 and/or network interface 120 may be implemented by one or more additional or alternative elements of device 140.

In some demonstrative embodiments, device 102 may include a mobile device and device 140 may be configured to connect device 102 to one or more other devices ("peripherals"), for example, including one or more USB devices, e.g., peripheral devices 162, 164, 166 and/or 168, and/or any other device.

For example, device 102 may include, or may be included as part of a mobile or portable device, for example, a mobile computer, a laptop computer, a notebook computer, a tablet computer, an Ultrabook™, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, a MID, an "Origami" device or computing device, a device that supports DCC, a context-aware device, a video device, an audio device, an A/V device, a data source, a Digital Still camera (DSC), a media player, or the like.

In one example, device 140 may be configured to connect between device 102 and devices 162, 164, 166 and/or 168 via one or more interfaces 139, for example, serial interfaces, e.g., USB interfaces and/or any other interface. Devices 162, 164, 166 and/or 168 may include for example, a mass storage device, e.g., a USB mass storage (UMS) device, a hard drive, an optical drive, a flash memory device, and the like.

In some demonstrative embodiments, device 140 may be connected to devices 162, 164, 166 and/or 168 via one or more USB interfaces 139 supporting one or more data transfer rates.

In some demonstrative embodiments, device 140 may include a hub 132, e.g., a USB hub, to connect between device 140 and one or more of devices 162, 164, 166 and 168. Additionally or alternatively, device 140 may be connected to one or more of devices 162, 164, 166 and 168 via any USB tree, which may include, for example, one or more USB hubs 142. For example, device 140 may include, or may be connected to, one or more USB ports, and each USB port may be connected to a USB device or be extended to several ports via USB hub 132 and/or USB hub 142.

In some demonstrative embodiments, devices 162, 164, 166 and/or 168 may include, operate as, perform a role of, perform one or more operations of, and/or perform one or more functionalities of, one or more Endpoints (EPs). For example, a USB device may include, operate as, perform a role of, perform one or more operations of, and/or perform one or more functionalities of, one EP or more than one EP. In one example, device 162 may include and/or perform the functionality of an EP 134, device 164 may include and/or perform the functionality of an EP 135 and an EP 136, device 166 may include and/or perform the functionality of an EP 138, and/or device 168 may include and/or perform the functionality of an EP 104.

In some demonstrative embodiments, devices 102 and/or 140 may be configured to communicate over a Media Agnostic (MA) USB ("MA USB" or "MAUSB") connection, e.g., as described below.

In some demonstrative embodiments, for example, device 102 may be configured to operate as, perform a role of, perform one or more operations of, and/or perform one or more functionalities of, a MA USB host 130; and/or device 140 may be configured to operate as, perform a role of, perform one or more operations of, and/or perform one or more functionalities of, a MA USB device 131, e.g., as described below.

In some demonstrative embodiments, MA USB host 130 and/or MA USB device 131 may be configured to manage, for example, a PAL connection between devices 102 and 140 over a MA link 106, and/or any other type of connection.

In some demonstrative embodiments, devices 102 and 140 may communicate over link 106 according to a wireless protocol, for example, a WiFi protocol, or a WLAN protocol, and/or any other wired and/or wireless protocol.

For example, a Media Agnostic Universal Serial Bus (MA USB) may include a PAL, which may be configured to enable connectivity between a USB host and one or more USB devices, e.g., including USB hubs, over medium other than USB, e.g., including wireless and/or IP links.

For example, MA USB device 131 may include an MA USB architectural element that integrates a USB device, and manages USB transfers targeting the USB device over a network connection. For example, the integrated device may be connected through wired USB (e.g., USB cable, USB chip-to-chip interconnect, etc.) or other technologies. For example, through MA USB device 131, the integrated device may be presented to the host system as a USB device compliant with a USB protocol or specification, e.g., a *Revision 2.0 or 3.1 of the USB Specification*.

For example, MA USB host 130 may include an architectural element of the MA USB PAL that includes a physical link interface and USB host logic, e.g., at least as defined in a *USB Specification*.

For example, MA USB host 130 and MA USB device 131 may communicate, for example, via a MA USB session, which may be defined between MA USB host 130 and MA USB device 131.

Some embodiments are described herein with respect to an MA SUB communication over a wireless link, e.g., utilizing the radios of devices 102 and/or 140. In other embodiments, the MA USB communication may be implemented over any other non-wireless link, e.g., in addition to or instead of the wireless link. For example, devices 102 and/or 140 may implement any non-wireless communication interface in addition to or instead of the radios 114 and/or 144.

Some demonstrative embodiments are described herein with reference to communicating a data stream including USB data over a wireless communication link according to a MA-USB or WSE protocol. However, other embodiments may be implemented with respect to communicating any other suitable data over any other communication link, according to any other communication protocol and/or over any other layer or PAL.

In some demonstrative embodiments, device 102 may operate as, perform a role of, perform one or more operations of, and/or perform one or more functionalities of, a USB host, and/or device 140 may operate as, perform a role of, perform one or more operations of; and/or perform one or more functionalities of, a USB device.

In some demonstrative embodiments, MA USB host 130 may operate as, perform a role of, perform one or more operations of, and/or perform one or more functionalities of, a Wi-Fi Serial Bus (WSB) host or WSE host; and/or MA USB device 131 may operate as, perform a role of, perform one or more operations of, and/or perform one or more functionalities of, a WSB device or WSE device.

In some demonstrative embodiments, MA USB host 130 may operate as, perform a role of, perform one or more operations of, and/or perform one or more functionalities of, a MA host; and/or MA USB device 131 may operate as, perform a role of, perform one or more operations of, and/or perform one or more functionalities of, a MA device.

In some demonstrative embodiments, MA USB host 130 and MA USB device 131 may communicate PAL traffic over communication link 106. For example, the PAL traffic may include PAL traffic of a PAL connection, over a PAL, e.g., between devices 102 and 140.

In some demonstrative embodiments, MA USB host 130 and/or MA USB device 131 may communicate USB traffic over the PAL via link 106. The USB traffic may include, for example, non-periodic (NP) traffic, e.g., bulk and/or control traffic, and/or periodic traffic, e.g., Isochronous and/or Interrupt traffic, which may be communicated by the EPs 134, 135, 136, 138 and/or 104.

In some demonstrative embodiments, the USB traffic may include traffic ("USB IN") delivered from the EPs the EPs 134, 135, 136, 138 and/or 104, via device 140, to device 102; and/or traffic ("USB OUT") delivered from device 102, via device 140, to the EPs the EPs 134, 135, 136, 138 and/or 104.

In some demonstrative embodiments, the USB PAL may enable transport of USB data over media other than USB cable, for example, wireless links, e.g., Wi-Fi or mmWave links, and/or wired links, e.g., Ethernet. The USB PAL may directly interface with network interfaces 110 and 120, e.g., to replace a network layer in the Open Systems Interconnection (OSI) model, or may be an IP application, interfacing with an IP (e.g., TCP/IP or UDP/IP) stack.

In some demonstrative embodiments, MA USB host 130 and MA USB device 131 may be configured to enable media-agnostic connectivity of a PAL between devices 102 and 140.

In some demonstrative embodiments, MA USB host 130 and MA USB device 131 may be configured to enable connectivity of the PAL between devices 102 and 140 over a wireless communication link, for example, a WLAN and/or WiFi link, e.g., as described below. However, in other embodiments, MA USB host 130 and MA USB device 131 may be configured to enable media-agnostic connectivity of the PAL between devices 102 and 140 over any other medium, for example, a WLAN link, an IP link, e.g., internet, Ethernet, over wire or wireless, a media-agnostic link, and the like.

In some demonstrative embodiments, MA USB host 130 and MA USB device 131 may be configured to interface, e.g., over link 106, between host logic, for example, a driver at a host platform, e.g., a device interface of device 102, and at least one peripheral controller of device 140.

In some demonstrative embodiments, controller 154 may perform the functionality of the peripheral controller of device 140.

In some demonstrative embodiments, controller 154 may be configured to control one or more peripheral devices connected to controller 154, e.g., peripheral devices 162, 164, 166 and/or 168.

In some demonstrative embodiments, the USB PAL may replace a USB physical cable.

For example, MA USB host 130 and MA USB device 131 may be configured to interface, e.g., over link 106, between USB host logic, for example, a USB Driver Interface (USBDI) at a host platform, e.g., a USBDI 137 of device 102, and at least one peripheral controller, for example, a USB controller, of device 140, e.g., controller 154.

In some demonstrative embodiments, a USBDI and/or a USB Driver Interface may include any suitable type and/or implementation of a USB driver interface and/or a USB device driver interface. In one example, the USBDI may include a USB Driver Interface, which may be specific to an Operating System (OS) (OS-specific). For example, an implementation and/or configuration of the USBDI may be based on, and/or in compliance with, an OS, one or more drivers and/or one or more upper layers, being implemented.

For example, USBDI 137 may communicate messages, for example, with an application on device 102, an Operating System (OS) of device 102, and/or with any other host and/or USB entity of device 102.

For example, controller 154 may include a USB controller, which may be implemented, for example, to control one or more USB devices connected to the USB controller 154, e.g., USB devices 162, 164, 166 and/or 168. For example, controller 154 may be implemented by software, hardware, and/or any combination thereof. In one example, controller 154 may, for example, perform the functionality of an extensible Host Controller Interface (xHCI), e.g., in accordance with the *USB 3.0 Specification*.

According to this example, the combination of MA USB host 130, network interface 110, network interface 120, and MA USB device 131 may be configured to replace and/or emulate the USB physical cable for connecting between a host device, e.g., device 102, and a peripheral device, e.g., a USB device, for example, included by or connected to device 140.

In some demonstrative embodiments, MA USB device 131 and/or MA USB host 130 may be configured to perform any other additional or alternative functionality.

In some demonstrative embodiments, for example, in some use cases, implementations and/or deployments, some USB devices may use a Bulk traffic type, for example, to communicate media streaming traffic, for example, to carry real-time periodic media streaming data, e.g., encoded video and/or audio targeting to USB display adaptors, and/or captured video and/or audio from a USB sensor (e.g., camera sensor). For example, such USB implementations, and/or other implementations, may rely on the abundant bandwidth and low latency existing over wired USB (3.0 or later) to satisfy Quality of Service (QoS) requirements.

In some demonstrative embodiments, there may be a need to address one or more technical aspects and/or problems, for example, when implementing some types of USB traffic, e.g., the media streaming traffic and/or any other suitable traffic, over a MA USB connection, e.g., as described below.

In some demonstrative embodiments, for example, while communicating traffic over a MA USB connection, some assumptions, e.g., bandwidth and/or latency assumptions, may not be fulfilled, for example, if the MAUSB protocol is implemented for remote or wireless connection between a host system and the USB device. For example, there may be connections, which are QoS limited, e.g., compared with the wired USB solutions.

In some demonstrative embodiments, there may be a need to address a technical aspect of supporting the handling of one or more types of traffic, e.g., at least real-time Bulk traffic, over MA USB, for example, while considering one or more needs and/or constraints, e.g., QoS needs.

In some demonstrative embodiments, a technical aspect of providing QoS separation between different types of traffic, for example, between real-time Bulk traffic and non real-time traffic (e.g., access to storage devices or NW adapters), may be addressed, for example, by defining a prioritization mechanism.

Some demonstrative embodiments may be configured to provide a technical solution to support time-based transfer delivery, for example, with an ability to define a deadline time or a target time for delivering data to/from the device (e.g., in accordance with a presentation time concept for MAUSB isochronous transfers), e.g., as described below.

Some demonstrative embodiments may be configured to provide a technical solution to provide a MAUSB protocol for Bulk endpoints, which may allow dropping transfers, e.g., as described below. This may be in contrast to a protocol, which mandates reliable and in-order delivery. Transfer dropping may be required, for example, for optimizing cases of late delivery of real-time traffic.

Some demonstrative embodiments may be configured to be implemented, for example, to support wireless Virtual Reality (VR) and/or Augmented Reality (AR) solutions, for example, while providing optimized QoS for the delivered video/audio traffic, which may require both transmitter and the receiver support.

In some demonstrative embodiments, devices 102 and/or 140 may be configured to communicate some types of traffic, for example, media streaming traffic and/or any other type of traffic, according to a protocol, which may allow to handle these types of traffic differently from other bulk traffic, e.g., as described below.

In some demonstrative embodiments, a new MAUSB transfer model may be defined, for example, to satisfy one or more technical needs, e.g., as described below.

In some demonstrative embodiments, devices 102 and/or 140 may be configured to communicate traffic according to a transfer model (also referred to as ""real-time bulk" MAUSB transfer"), e.g., as described below.

In some demonstrative embodiments, a MAUSB host, e.g., MA USB host 130, may be configured to select the transfer model, for example, upon opening a bulk End Point (EP) that will carry real-time media streaming data, e.g., as described below. In other embodiments, the transfer model may be used for any other additional or alternative type of traffic.

In some demonstrative embodiments, the new transfer model, e.g. as described below, may be configured to allow communicating a delivery deadline, for example, based on a synchronized clock between the MAUSB host and the MAUSB device. In one example, the synchronized clock may be implemented, for example, according to a sync mechanism, e.g., in compliance with an MA USB Specification.

In some demonstrative embodiments, the new transfer model, e.g. as described below, may be configured to allow packet drop and/or out of order delivery, for example, in compliance with a definition of an isochronous transfer model of an *MA USB Specification*.

In some demonstrative embodiments, implementing the transfer model, e.g., as described below, may allow one or more technical benefits, for example, to allow optimized handling of real-time bulk traffic and/or any other traffic, for example, while maintaining compliance with an *MAUSB Standard*, thus providing an interoperable MAUSB solution.

In some demonstrative embodiments, implementing the transfer model, e.g., as described below, may allow one or more technical benefits, for example, for implementation of wireless VR solutions, e.g., by providing optimized QoS for the delivered video/audio traffic.

In some demonstrative embodiments, devices 102 a/or 140 may be configured to implement "Realtime bulk" transfer models, for example, for one or both of IN and OUT transfers, e.g., as described below.

Figure 2:
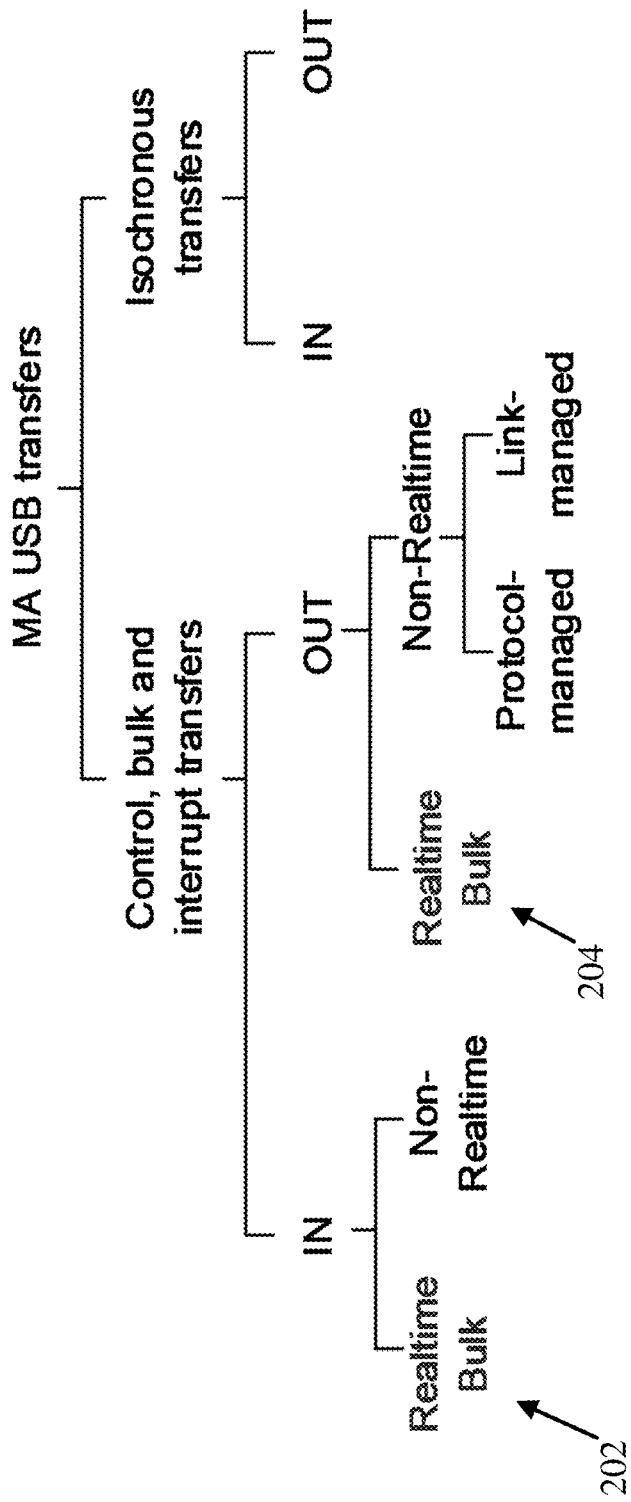
FIG. 2 is a schematic illustration of Media Agnostic (MA) Universal Serial Bus (USB) transfer models, in accordance with some demonstrative embodiments.

Reference is made to FIG. 2, which schematically illustrates MA USB transfer models, in accordance with some demonstrative embodiments.

In some demonstrative embodiments, as shown in FIG. 2, the transfer models for MAUSB may be enhanced to include "Realtime bulk" transfer models, for example, including an IN real time bulk transfer 202, and/or an OUT real time bulk transfer 204, e.g., as described below.

Referring back to FIG. 1, in some demonstrative embodiments, devices 102 and/or 140 may be configured to communicate a real time transfer request packet and/or a real time transfer response packet, e.g., as described below.

In some demonstrative embodiments, a protocol between the MAUSB Host (also referred to as "HPAL"), e.g., MA USB host 130, and the MAUSB device (also referred to as "DPAL"), e.g., MA USB device 131, shall make use of 2 newly defined data packet subtypes, for example, RealtimeTransferReq and RealtimeTransferResp, e.g., as described below.

In some demonstrative embodiments, for example, for a transfer in the OUT direction, the transfer payload shall be included in one or more RealtimeTransferReq packets sent by the HPAL and the transfer shall be concluded by either a RealtimeTransferResp or a defined timeout.

In some demonstrative embodiments, for example, for a transfer in the IN direction, the transfer shall be initiated by HPAL using a single RealtimeTransferReq packet and concluded by one or more RealtimeTransferResp packets to carry the payload received from the USB device, or concluded after a defined timeout.

In some demonstrative embodiments, a real time transfer request, e.g., each RealtimeTransferReq packet, shall carry a delivery deadline, which signals the latest time that the transfer shall be exchanged with the USB device (e.g., with the actual device endpoint).

In some demonstrative embodiments, for example, for an OUT transfer, the deadline may refer to the payload delivered within the current RealtimeTransferReq packet, e.g., as described below.

In some demonstrative embodiments, for example, for an IN transfer, the deadline may refer to the latest time of consuming the entire transfer from the USB device, e.g., as described below.

In some demonstrative embodiments, payload of the OUT transfer that was not delivered to the device before its deadline can be discarded. This may lead to transfer failure after the transfer timeout, e.g., as described below.

In some demonstrative embodiments, the payload discarding can be optionally communicated to the HPAL, for example, using a RealtimeTransferResp containing an error, for example, to support expedited processing, e.g., as described below.

In some demonstrative embodiments, an IN transfer or part of it that was not read from the device before its deadline can be discarded. This may lead to transfer failure after the transfer timeout, e.g., as described below.

In some demonstrative embodiments, one or more parts of the transfer that were read before the deadline will be delivered to the HPAL, for example, using a RealtimeTransferResp packet, allowing the HPAL to deliver those parts to an upper layer, for example, even though an error is reported on the entire transfer, e.g., as described below.

In some demonstrative embodiments, the transfer discard can be optionally communicated to the HPAL, for example, using a RealtimeTransferResp containing an error, for example, to support expedited processing, e.g., as described below.

In some demonstrative embodiments, a real time transfer response, e.g., each RealtimeTransferResp packet, belonging to an IN transfer shall contain the actual delivery time, of the last payload byte in that packet, from the USB device (e.g., referring to the actual data consumption time from the USB endpoint), e.g., as described below.

In some demonstrative embodiments, the HPAL may choose not to specify a delivery deadline, for example, by signaling a delivery-time valid flag=false over an IN or an OUT real-time transfer. In this case, for example, the DPAL shall not discard the transfer or part of it based on service time of the transfer, e.g., as described below.

In some demonstrative embodiments, the transfer timeout shall be determined, for example, based on the transfer delivery deadline and the delays associated with MA USB host/device processing time and the delays of the underlying link.

In other embodiments, any other additional or alternative parameter may be used to determine the transfer timeout.

In some demonstrative embodiments, both HPAL and DPAL shall be capable of recognizing packet loss, for example, when receiving out of order packets with increased reqID or Sequence-Number.

In some demonstrative embodiments, the HPAL and/or DPAL shall be capable of failing the relevant transfers and continuing serving the next received transfers, e.g., as described below.

In some demonstrative embodiments, for example, if delivery time allows, the HPAL and/or DPAL may choose to implement a reordering function, for example, instead of immediate transfer failure in out-of-order cases, e.g., as described below.

In some demonstrative embodiments, device 102 may be configured to operate as, perform a role of, perform one or more operations of, and/or perform one or more functionalities of, a USB host (also referred to as "a USB host device", or "a host platform").

In some demonstrative embodiments, device 140 may be configured to operate as, perform a role of, perform one or more operations of, and/or perform one or more functionalities of, a USB device (also referred to as "a device platform").

In some demonstrative embodiments, devices 102 and/or 140 may be configured to communicate Realtime bulk MA USB transfers over an MA USB PAL, e.g., as described below.

In some demonstrative embodiments, controller 124 may be configured to cause, trigger, and/or control MA USB host 130 to process a request message from USBDI 137 for a real time data transfer to be delivered between a USB host, implemented by device 102, and a USB device EP, for example, EP 134, 135, 136, 138, and/or 104, e.g., as described below.

In some demonstrative embodiments, controller 124 may be configured to cause, trigger, and/or control MA USB host 130 to transmit at least one real time transfer request to MA USB device 131 of the MA USB PAL, for example, based on the request message, e.g., as described below.

In some demonstrative embodiments, a header of the real time transfer request may include a request Identifier (ID) field, for example, to identify the real time data transfer, and a delivery time field, for example, to indicate a delivery time to complete delivery of the real time data transfer, e.g., as described below.

In some demonstrative embodiments, controller 124 may be configured to cause, trigger, and/or control MA USB host 130 to send a response to USBDI 137, for example, based on a determination that the real time data transfer is not to be completed by the delivery time, e.g., as described below.

In some demonstrative embodiments, the response to USBDI 137 may include an error indication to indicate failure of the real time data transfer, e.g., as described below.

In some demonstrative embodiments, controller 124 may be configured to cause, trigger, and/or control MA USB host 130 to determine that the real time data transfer is not to be completed by the delivery time, for example, based on an out of order real time transfer response, e.g., from device 140, including at least one of an out of order request ID, or an out of order sequence number, e.g., as described below.

In some demonstrative embodiments, controller 124 may be configured to cause, trigger, and/or control MA USB host 130 to terminate the real time data transfer, for example, based on the determination that the real time data transfer is not to be completed by the delivery time, e.g., as described below.

In some demonstrative embodiments, the header of the real time transfer request may include a budget field to indicate a time budget remaining from a generation time of the real time transfer request to the delivery time, e.g., as described below.

In some demonstrative embodiments, controller 124 may be configured to allow MA USB host 130 to transmit the real time transfer request to MA USB device 131, for example, based on a real time bulk capability indication in an MA USB capability response from MA USB device 131, the real time bulk capability indication to indicate support of real time bulk transfers, e.g., as described below.

In some demonstrative embodiments, controller 124 may be configured to cause, trigger, and/or control MA USB host 130 to transmit to MA USB device 131 an EP handle request message including an indication that the USB device EP, for example, EP 134, 135, 136, 138, and/or 104, is to be used for real time bulk transfers, e.g., as described below.

In some demonstrative embodiments, controller 154 may be configured to cause, trigger, and/or control MA USB device 131 to receive at least one real time transfer request from MA USB host 130 of the MA USB PAL, e.g., as described below.

In some demonstrative embodiments, the real time transfer request may request a real time data transfer to be delivered between the USB host, e.g., the USB host of device 102, and the USB device EP, for example, EP 134, 135, 136, 138, and/or 104, e.g., as described below.

In some demonstrative embodiments, a header of the real time transfer request may include a request ID field, for example, to identify the real time data transfer, and a delivery time field to indicate a delivery time to complete delivery of the real time data transfer, e.g., as described below.

In some demonstrative embodiments, controller 154 may be configured to cause, trigger, and/or control MA USB device 131 to send a real time transfer response to MA USB host 130, for example, based on a determination that the real time data transfer is not to be completed by the delivery time, e.g., as described below.

In some demonstrative embodiments, the real time transfer response may include an error indication to indicate that the real time data transfer cannot be completed by the delivery time, e.g., as described below.

In some demonstrative embodiments, controller 154 may be configured to cause, trigger, and/or control MA USB device 131 to transmit to MA USB host 130 one or more real time transfer responses including a header including the request ID and a budget field to indicate a time budget remaining from a generation time of a real time transfer response carrying the budget field to the delivery time, e.g., as described below.

In some demonstrative embodiments, controller 154 may be configured to cause, trigger, and/or control MA USB device 131 to include a real time bulk capability indication in an MA USB capability response to MA USB host 130, the real time bulk capability indication to indicate support of real time bulk transfers, e.g., as described below.

In some demonstrative embodiments, controller 154 may be configured to cause, trigger, and/or control MA USB device 131 to process an EP handle request message from MA USB host 130, including an indication that the USB device EP is to be used for real time bulk transfers, e.g., as described below.

In some demonstrative embodiments, MA USB host 130 and MA USB device 131 may be configured to communicate messages of a real time IN transfer, e.g., as described below.

In some demonstrative embodiments, the request message, for example, from MA USB host 130 to MA USB device 131, may include a read request for a real time IN transfer of data to be delivered from the USB device EP to the USB host, e.g., as described below.

For example, the request message may include a read request for a real time IN transfer of data to be delivered from EP 134, 135, 136, 138, and/or 104 to device 102.

In some demonstrative embodiments, the delivery time may include a time to complete delivery of the data from the USB device EP to the MA USB host, e.g., as described below.

For example, the delivery time may include a time to complete delivery of the data from EP 134, 135, 136, 138, and/or 104 to MA USB host 130.

In some demonstrative embodiments, controller 124 may be configured to cause, trigger, and/or control MA USB host 130 to determine that the real time data transfer is not to be completed by the delivery time, for example, based on a timeout of the delivery time prior to completing receipt of the data in one or more real time transfer responses from MA USB device 131, e.g., as described below.

In some demonstrative embodiments, controller 124 may be configured to cause, trigger, and/or control MA USB host 130 to determine that the real time data transfer is not to be completed by the delivery time, for example, based on an error indication in a real time transfer response from MA USB device 131, prior to a timeout of the delivery time, e.g., as described below.

In some demonstrative embodiments, the error indication in the real time transfer response may indicate that delivery of the data from the USB device EP cannot be completed before the delivery time, e.g., as described below.

In some demonstrative embodiments, the real time transfer response may include partial data of the real time IN transfer from the USB device EP, for example, EP 134, 135, 136, 138, and/or 104, e.g., as described below.

In some demonstrative embodiments, controller 154 may be configured to cause, trigger, and/or control MA USB device 131 to include in the real time transfer response partial data of the real time IN transfer from the USB device EP, for example, from EP 134, 135, 136, 138, and/or 104, e.g., as described below.

In some demonstrative embodiments, controller 124 may be configured to cause, trigger, and/or control MA USB host 130 to provide to USBDI 137 partial data of the real time IN transfer, which, for example, is received in one or more real time transfer responses from MA USB device 131, for example, prior to and/or until the determination that the real time data transfer is not to be completed by the delivery time, e.g., as described below.

In some demonstrative embodiments, controller 154 may be configured to cause, trigger, and/or control MA USB device 131 to transmit to MA USB host 130 one or more real time transfer responses including at least part of the data of the IN transfer, a header of the one or more real time transfer responses including the request ID, e.g., as described below.

In some demonstrative embodiments, the header of the one or more real time transfer responses may include a delivery time field including an actual delivery time of a last payload byte from the USB device EP, for example, from EP 134, 135, 136, 138, and/or 104, e.g., as described below.

In some demonstrative embodiments, controller 124 may be configured to cause, trigger, and/or control MA USB host 130 to process the one or more real time transfer responses from MA USB device 131, e.g., as described below.

Figure 3:
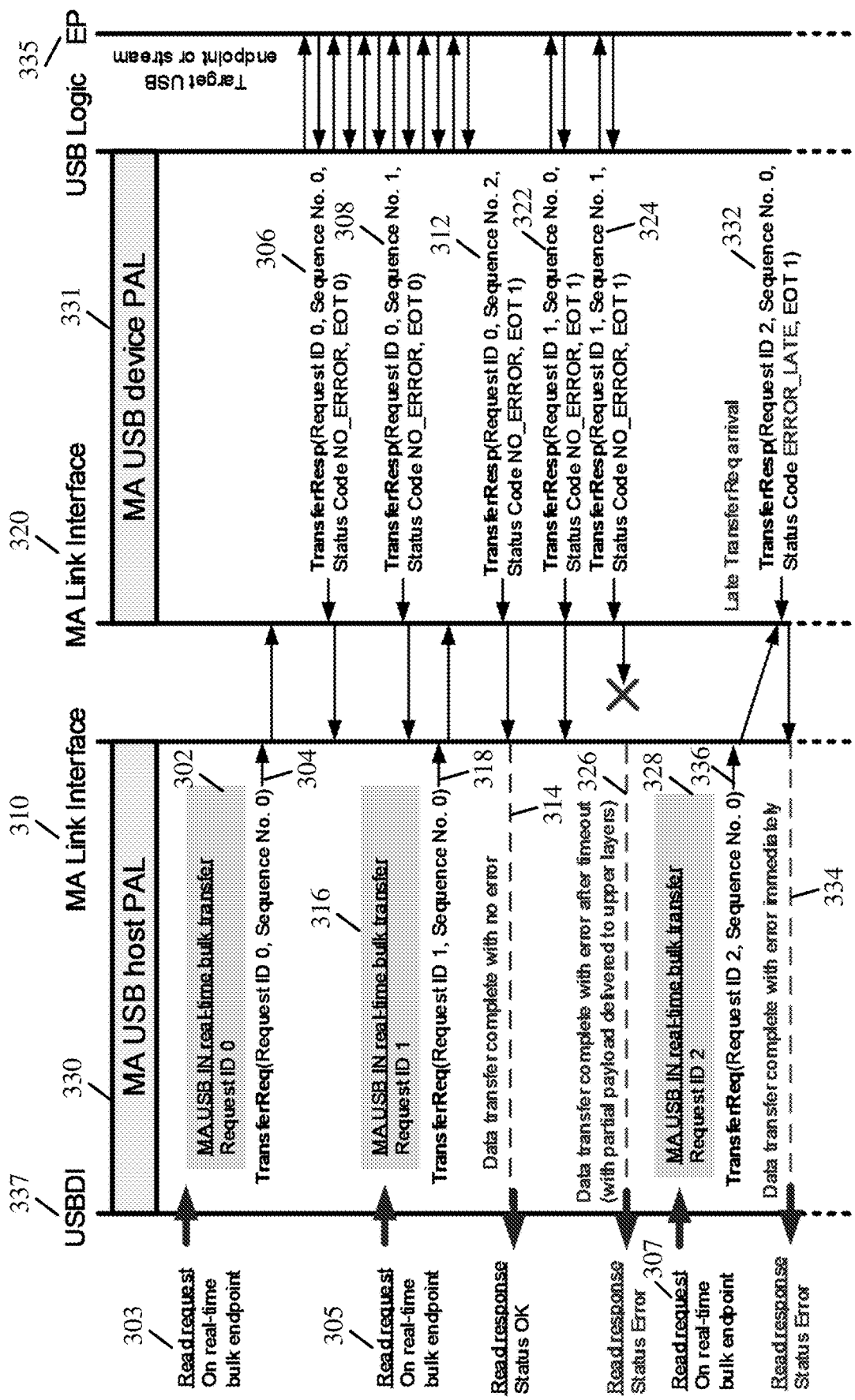
FIG. 3 is a schematic illustration of communications over an MA USB connection, in accordance with some demonstrative embodiments.

Reference is made to FIG. 3, which schematically illustrates communications over an MA USB connection, in accordance with some demonstrative embodiments.

In some demonstrative embodiments, one or more of the operations and/or communications of FIG. 3 may be implemented as part of IN protocol sequences of real time IN transfers.

In some demonstrative embodiments, for example, device 102 (FIG. 1) may be configured to operate as, perform a role of, perform one or more operations of, and/or perform one or more functionalities of, a USB host; and/or device 140 (FIG. 1) may be configured to operate as, perform a role of, perform one or more operations of, and/or perform one or more functionalities of, a USB device.

For example, MA USB host 130 (FIG. 1) may be configured to operate as, perform a role of, perform one or more operations of, and/or perform one or more functionalities of, an MA USB host PAL 330.

For example, MA USB device 131 (FIG. 1) may be configured to operate as, perform a role of, perform one or more operations of, and/or perform one or more functionalities of, an MA USB device PAL 331.

In some demonstrative embodiments, as shown in FIG. 3, MA USB host PAL 330 may process a read request message 303 from a USBDI 337 for a real time data transfer to be delivered between MA USB host PAL 330 and a USB device EP 335.

For example, USBDI 137 (FIG. 1) may be configured to operate as, perform a role of, perform one or more operations of, and/or perform one or more functionalities of, USBDI 337.

For example, USB device EP 335 may be configured to operate as, perform a role of, perform one or more operations of, and/or perform one or more functionalities of, an EP of EP 134, 135, 136, 138, and/or 104 (FIG. 1).

In some demonstrative embodiments, MA USB host PAL 330 may be configured to transmit at least one real time transfer request to MA USB device PAL 331, for example, based on read request message 303.

In some demonstrative embodiments, as shown in FIG. 3, the payload of each transfer may include, for example, 3 packets. A first transfer 302 (marked with reqID=0) describes a successful transfer including a single RealtimeTransferReq and 3 RealtimeTransferResp packets.

In some demonstrative embodiments, as shown in FIG. 3, MA USB host PAL 330 may transmit a RealtimeTransferReq 304 to MA USB device PAL 331, for example, via an MA Link Interface 310.

For example, network interface 110 (FIG. 1) may be configured to operate as, perform a role of, perform one or more operations of, and/or perform one or more functionalities of, MA Link Interface 310.

In some demonstrative embodiments, as shown in FIG. 3, MA USB device PAL 331 may receive RealtimeTransferReq 304 from MA USB host PAL 330, for example, via an MA Link Interface 320.

For example, network interface 120 (FIG. 1) may be configured to operate as, perform a role of, perform one or more operations of, and/or perform one or more functionalities of, MA Link Interface 320.

In some demonstrative embodiments, as shown in FIG. 3, MA USB device PAL 331 may transmit to MA USB host PAL 330 three real time transfer responses, for example, RealtimeTransferResp 306, RealtimeTransferResp 308, and RealtimeTransferResp 312, e.g., including the traffic requested by RealtimeTransferReq 304.

In some demonstrative embodiments, as shown in FIG. 3, MA USB host PAL 330 may send a response 314 to USBDI 337, for example, after receiving RealtimeTransferResp 312 from MA USB device PAL 331, which includes an End of Transfer (EoT) indication to indicate the successful data transfer. For example, response 314 may include an indication to indicate success of the real time data transfer.

In some demonstrative embodiments, as shown in FIG. 3, any case of packet drop over the MA link interface, e.g., a link between MA link interface 310 and MA link interface 320, may lead to transfer completion with error after the transfer timeout, e.g., as described below.

In some demonstrative embodiments, as shown in FIG. 3, a second transfer 316 (reqID=1) shows such a case of packet drop. In this case, for example, part of the transfer was successfully delivered to HPAL, e.g., MA USB host PAL 330, and can be delivered also to an upper layer, for example, USBDI 337, e.g., though the transfer itself failed. Although FIG. 3 shows packet loss only in one direction, loss in the opposite direction may lead to a similar failure.

In some demonstrative embodiments, as shown in FIG. 3, MA USB host PAL 330 may process a read request message 305 from USBDI 337, and transmit a RealtimeTransferReq 318 to MA USB device PAL 331.

In some demonstrative embodiments, as shown in FIG. 3, MA USB device PAL 331 may receive RealtimeTransferReq 318 from MA USB host PAL 330, and transmit to MA USB host PAL 330 two real time transfer responses, for example, a RealtimeTransferResp 322, and a RealtimeTransferResp 324.

In some demonstrative embodiments, as shown in FIG. 3, RealtimeTransferResp 324 may not be successfully delivered to MA USB host PAL 330.

In some demonstrative embodiments, as shown in FIG. 3, MA USB host PAL 330 may send a response 326 to USBDI 337, for example, based on a determination that the real time transfer cannot be completed by the delivery time. In one example, MA USB host PAL 330 may determine that the real time transfer cannot be completed by the delivery time, for example, based on expiration of the delivery time prior to receipt of a transfer response, e.g., response 324, confirming completion of the real time transfer.

For example, response 326 may include partial data of the real time IN transfer, which, for example, is received in a real time transfer response from MA USB host PAL 330, e.g., RealtimeTransferResp 322, for example, prior to the determination that the real time data transfer is not to be completed by the delivery time.

In some demonstrative embodiments, as shown in FIG. 3, a third transfer 328 (reqID=2) describes late arrival of a RealtimeTransferReq packet (e.g., post the requested deadline).

For example, in this case the DPAL, e.g., MA USB device PAL 331, shall communicate the failure using a RealtimeTransferResp packet with a new error code (ERROR_LATE) and/or any other indication, and the transfer shall be immediately complete to upper layer with error.

In some demonstrative embodiments, the DPAL can select to use such RealtimeTransferResp with error indication also in case RealtimeTransferReq arrived on time but couldn't be executed on time with the target USB device.

In some demonstrative embodiments, as shown in FIG. 3, MA USB host PAL 330 may process a read request message 307 from USBDI 337, and transmit a RealtimeTransferReq 336 to MA USB device PAL 331.

In some demonstrative embodiments, as shown in FIG. 3, MA USB device PAL 331 may receive RealtimeTransferReq 336 from MA USB host PAL 330, for example, post the requested deadline, and transmit to MA USB host PAL 330 RealtimeTransferResp 332 to indicate failure of the real time data transfer.

In some demonstrative embodiments, as shown in FIG. 3, MA USB host PAL 330 may send a response 334 to USBDI 337, e.g., based on the failure indication in RealtimeTransferResp 332. For example, response 334 may include an error indication to indicate failure of the real time data transfer.

Referring back to FIG. 1, in some demonstrative embodiments, MA USB host 130 and MA USB device 131 may be configured to communicate messages of a real time OUT data transfer, e.g., as described below.

In some demonstrative embodiments, MA USB host 130 and MA USB device 131 may be configured to communicate the request message, which may include a read request for a real time OUT data transfer of data to be delivered from the USB host, e.g. device 102, to the USB device EP, e.g., EP 134, 135, 136, 138, and/or 104, as described below.

In some demonstrative embodiments, MA USB host 130 and MA USB device 131 may be configured to communicate the request message including a delivery time, which may include a time to complete delivery of the data from the MA USB host to the USB device EP, for example from MA USB host 130 to EP 134, 135, 136, 138, and/or 104, e.g., as described below.

In some demonstrative embodiments, controller 124 may be configured to cause, trigger, and/or control MA USB host 130 to determine that the real time data transfer is not to be completed by the delivery time, for example, based on a timeout of the delivery time prior to receipt of a success indication in a real time transfer response from MA USB device 131, the success indication to indicate successful delivery of the data to the USB device EP, e.g., as described below.

In some demonstrative embodiments, controller 124 may be configured to cause, trigger, and/or control MA USB host 130 to determine that the real time data transfer is not to be completed by the delivery time, for example, based on an error indication in the real time transfer response from MA USB device 131, for example, prior to a timeout of the delivery time, e.g., as described below.

In some demonstrative embodiments, the error indication in the real time transfer response may indicate that delivery of the data to the USB device EP, for example, EP 134, 135, 136, 138, and/or 104, cannot be completed before the delivery time, e.g., as described below.

In some demonstrative embodiments, the real time transfer response may include an indication of partial data of the real time OUT transfer delivered to the USB device EP, for example, EP 134, 135, 136, 138, and/or 104, e.g., as described below.

In some demonstrative embodiments, controller 154 may be configured to cause, trigger, and/or control MA USB device 131 to include in a real time transfer response an indication of partial data of the real time OUT transfer delivered to the USB device EP, for example, EP 134, 135, 136, 138, and/or 104, e.g., as described below.

In some demonstrative embodiments, controller 124 may be configured to cause, trigger, and/or control MA USB host 130 to include in the response to USBDI 137 an indication of the partial data of the real time OUT transfer delivered to the USB device EP, for example, EP 134, 135, 136, 138, and/or 104, e.g., as described below.

Figure 4:
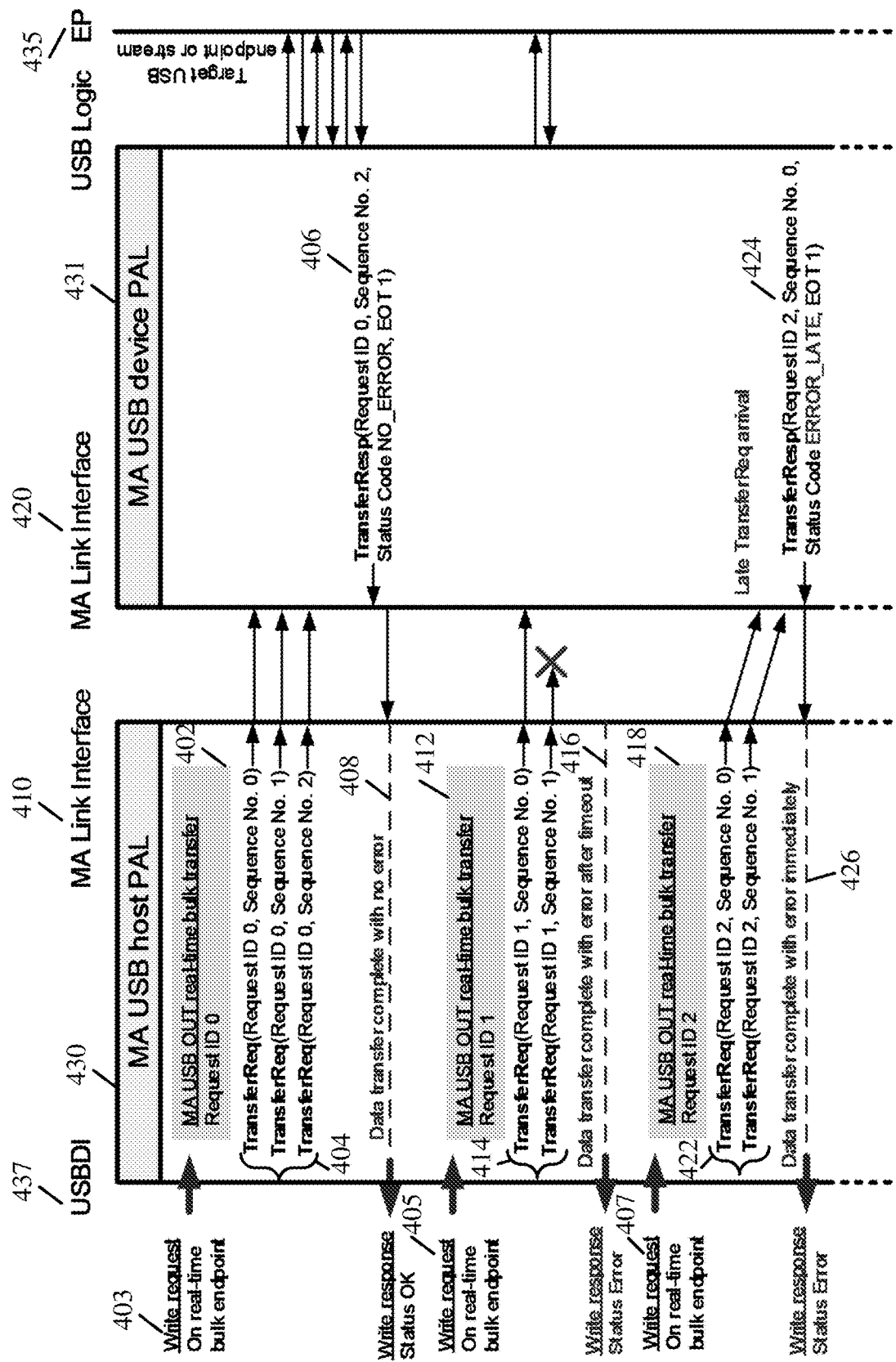
FIG. 4 is a schematic illustration of communications over an MA USB connection, in accordance with some demonstrative embodiments.

Reference is made to FIG. 4, which schematically illustrates communications over an MA USB connection, in accordance with some demonstrative embodiments.

In some demonstrative embodiments, one or more of the operations and/or communications of FIG. 4 may be implemented as part of OUT protocol sequences of real time OUT transfers.

In some demonstrative embodiments, for example, device 102 (FIG. 1) may be configured to operate as, perform a role of, perform one or more operations of, and/or perform one or more functionalities of, a USB host; and/or device 140 (FIG. 1) may be configured to operate as, perform a role of, perform one or more operations of, and/or perform one or more functionalities of, a USB device.

For example, MA USB host 130 (FIG. 1) may be configured to operate as, perform a role of, perform one or more operations of, and/or perform one or more functionalities of, an MA USB host PAL 430.

For example, MA USB device 131 (FIG. 1) may be configured to operate as, perform a role of, perform one or more operations of, and/or perform one or more functionalities of, an MA USB device PAL 431.

In some demonstrative embodiments, as shown in FIG. 4, MA USB host PAL 430 may process a write request message 403 from a USBDI 437 for a real time data transfer to be delivered from MA USB host PAL 430 to a USB device EP 435.

For example, USBDI 137 (FIG. 1) may be configured to operate as, perform a role of, perform one or more operations of, and/or perform one or more functionalities of, USBDI 437.

For example, USB device EP 435 may be configured to operate as, perform a role of, perform one or more operations of, and/or perform one or more functionalities of, an EP of EP 134, 135, 136, 138, and/or 104 (FIG. 1).

In some demonstrative embodiments, MA USB host PAL 430 may be configured to transmit at least one real time transfer request to MA USB device PAL 431, for example, based on write request message 403.

In some demonstrative embodiments, as shown in FIG. 4, the payload of each transfer may include, for example, 3 packets. A first transfer 402 (marked with reqID=0) describes a successful transfer composed of 3 RealtimeTransferReq packets and a single RealtimeTransferResp packet.

In some demonstrative embodiments, as shown in FIG. 4, MA USB host PAL 430 may transmit to MA USB device PAL 431, for example, via an MA Link Interface 410, for example, three real time transfer requests, e.g., RealtimeTransferReq 404.

For example, network interface 110 (FIG. 1) may be configured to operate as, perform a role of, perform one or more operations of, and/or perform one or more functionalities of, MA Link Interface 410.

In some demonstrative embodiments, as shown in FIG. 4, MA USB device PAL 431 may receive RealtimeTransferReq 404 from MA USB host PAL 430, for example, via an MA Link Interface 420.

For example, network interface 120 (FIG. 1) may be configured to operate as, perform a role of, perform one or more operations of, and/or perform one or more functionalities of, MA Link Interface 420.

In some demonstrative embodiments, as shown in FIG. 4, MA USB device PAL 431 may be configured to transmit to MA USB host PAL 430 a single real time transfer response, for example, RealtimeTransferResp 406, to acknowledge successful delivery of the data transfer to the EP 435.

In some demonstrative embodiments, as shown in FIG. 4, MA USB host PAL 430 may send a response 408 to USBDI 437, for example, after receiving RealtimeTransferResp 406 from MA USB device PAL 431, which includes an EoT indication to indicate the successful delivery of the data transfer. For example, response 408 may include an indication to indicate success of the real time data transfer.

In some demonstrative embodiments, as shown in FIG. 4, any case of packet drop over the MA link interface, for example, a link between MA link interface 410 and MA link interface 420, will lead to transfer completion with error after the transfer timeout.

In some demonstrative embodiments, as shown in FIG. 4, a second transfer 412 (reqID=1) shows such a case of packet loss. Although FIG. 4 shows packet loss only in one direction, loss in the opposite direction may lead to a similar failure.

In some demonstrative embodiments, as shown in FIG. 4, MA USB host PAL 430 may process a write request message 405 from USBDI 437, and may transmit to MA USB device PAL 431, for example, two real time transfer requests, e.g., RealtimeTransferReq 414.

In some demonstrative embodiments, as shown in FIG. 4, MA USB host PAL 430 may not receive a response from MA USB device PAL 431, for example, before expiration of the delivery time for the real time transfer.

In some demonstrative embodiments, as shown in FIG. 4, MA USB host PAL 430 may send a response 416 to USBDI 437, e.g., based on a timeout of the delivery time prior to receipt of a success indication in a real time transfer response from MA USB device PAL 431. For example, response 416 may include an error indication to indicate failure of the real time data transfer, for example, due to timeout.

In some demonstrative embodiments, as shown in FIG. 4, a third transfer 418 (reqID=2) describes late arrival of a RealtimeTransferReq packet (post the requested deadline).

For example, in this case, the DPAL, e.g., MA USB device PAL 431, shall communicate the failure using a RealtimeTransferResp packet with a new error code (ERROR_LATE) and/or any other indication, and the transfer shall be immediately complete to upper layer with error.

In some demonstrative embodiments, the RealtimeTransferReq packet may have its own deadline, for example, so a late arrival case can be determined by DPAL on any RealtimeTransferReq packet (FIG. 4 shows late arrival of the first packet only).

In some demonstrative embodiments, for example, the DPAL can select to send RealtimeTransferResp with ERROR_LATE indication also in case RealtimeTransferReq arrived on time but couldn't be executed on time with the target USB device.

In some demonstrative embodiments, as shown in FIG. 4, MA USB host PAL 430 may process a write request message 407 from USBDI 437, and may transmit, for example, two RealtimeTransferReq 422 to MA USB device PAL 431.

In some demonstrative embodiments, as shown in FIG. 4, MA USB device PAL 431 may receive RealtimeTransferReq 422 from MA USB host PAL 430, for example, post the requested deadline, and may transmit to MA USB host PAL 430 a RealtimeTransferResp 424 including an error indication to indicate failure of the real time data transfer.

In some demonstrative embodiments, as shown in FIG. 4, MA USB host PAL 430 may send a response 426 to USBDI 437, for example, based on the error indication in RealtimeTransferResp 424 from MA USB device PAL 431, for example, even if the RealtimeTransferResp 424 is received prior to a timeout of the delivery time for the real time transfer. For example, response 426 may include an error indication to indicate failure of the real time data transfer.

Reference is made to FIG. 5, which schematically illustrates a format of packet headers 500, in accordance with some demonstrative embodiments.

In one example, devices 102 (FIG. 1) and/or 140 (FIG. 1) may be configured to generate, transmit, receive and/or process one or more messages having the structure and/or format of packet headers 500.

In some demonstrative embodiments, one or more fields, e.g., some or all, of the format of packet headers 500 may be implemented for RealtimeTransferReq and/or RealtimeTransferResp packet headers. In other embodiments, any other additional and/or alternative fields and/or format may be used.

In some demonstrative embodiments, the RealtimeTransferReq shall carry a MAUSB timestamp 504 and Media time/transmission delay 502, for example, in accordance with one or more rules defined for IsochTransferReq packets, and/or any other rules.

In some demonstrative embodiments, R-flags field 506 may contain a "MTD valid" flag, as may be defined for Isoch transfers.

In some demonstrative embodiments, R-flags field 506 may contain a "DT valid" flag, for example, to signal the validity of the delivery time, e.g., as described above.

In some demonstrative embodiments, a budget field 508 may be an optional field, which may carry, for example, the time budget remaining from the time of packet generation till the delivery time. This may provide statistical information, which may, for example, help to analyze and/or optimize system performance. The presence of this field may be indicated, for example, by a flag in R-flags field 506, and/or by any other indication.

In some demonstrative embodiments, for example, for an OUT transfer, a remaining size field 510 in the RealtimeTransferReq may carry the remaining number of bytes in the transfer (e.g., not including current packet).

In some demonstrative embodiments, for example, remaining size field 510 may be reserved, for example, for a RealtimeTransferResp of an OUT transfer (e.g., no credit mechanism).

In some demonstrative embodiments, for example, for an IN transfer, remaining size field 510 in the RealtimeTransferReq may carry the size of the transfer.

In some demonstrative embodiments, for example, for an IN transfer, remaining size field 510 in the RealtimeTransferResp packet may carry the remaining number of bytes in the transfer (e.g., not including current packet).

In some demonstrative embodiments, sequencing rules may be implemented for a Request ID (ReqID) field 512, and/or a Sequence-Number field 514 within IN/OUT realtime bulk transfer packets, for example, in accordance with sequencing rules for IN/OUT isochronous transfers, e.g., respectively.

In some demonstrative embodiments, an MA USB device, e.g., device 140 (FIG. 1), shall declare its support of the new transfer model, for example, by using an indication within a MAUSB capability response message. In one example, a new Realtime bulk capability descriptor indicating support of the real time bulk transfer by an MAUSB device, e.g., MA USB device 131 (FIG. 1), support shall be included in the MAUSB capability response in this case. In other embodiments, any other indication and/or message may be used.

In some demonstrative embodiments, an MA USB host, e.g., MA USB host 130 of device 102 (FIG. 1), may learn of whether a bulk endpoint is used for real-time transfers, for example, during enumeration of the device.

In some demonstrative embodiments, for example, upon opening a new bulk EP, e.g., using an EpHandleReq message, an MAUSB host, e.g., MA USB host 130 (FIG. 1), shall indicate whether the EP shall operate as a Realtime bulk EP or not, for example, using a dedicated flag or any other indication. In one example, operation as a Realtime bulk EP is allowed only if MA USB device 131 (FIG. 1) has declared support for it. In other embodiments, any other message, indication and/or mechanism may be used.

In some demonstrative embodiments, a Realtime bulk transfer may operate over a USB bulk stream, e.g., a USB3.0 bulk stream.

In some demonstrative embodiments, for example, the operation described above per endpoint shall be repeated separately per each stream.

In some demonstrative embodiments, for example, a Stream Identifier (StreamID) may be included in all RealtimeTransferReq and/or RealtimeTransferResp packets, e.g., to support this operation.

Figure 6:
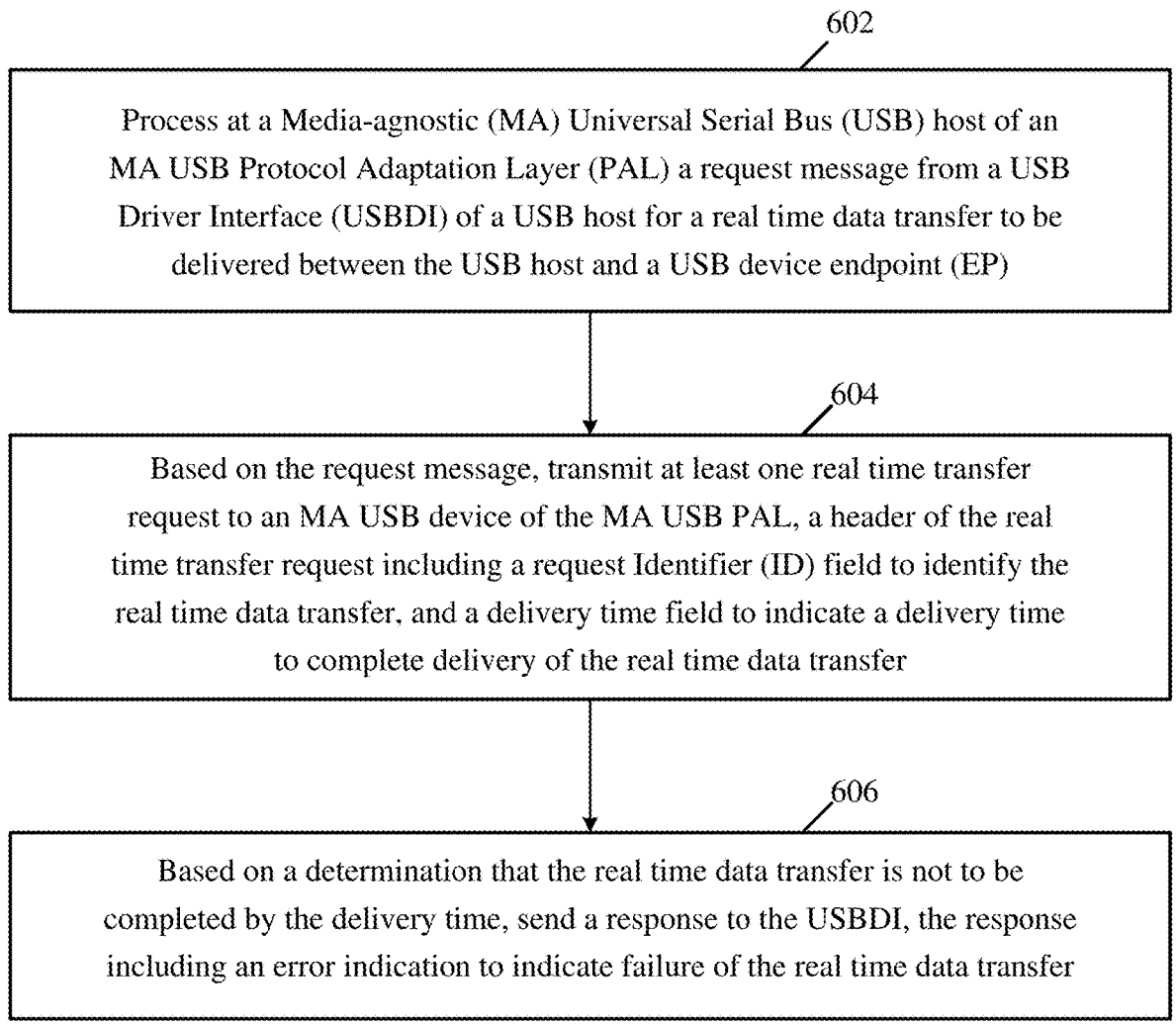
FIG. 6 is a schematic flow-chart illustration of a method of communicating over an MA USB connection, in accordance with some demonstrative embodiments.

Reference is made to FIG. 6, which schematically illustrates a method of communicating over an MA USB connection, in accordance with some demonstrative embodiments. For example, one or more of the operations of the method of FIG. 6 may be performed by one or more elements of a system, e.g., system 100 (FIG. 1), for example, one or more devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1)

and/or radio 144 (FIG. 1), a USB Driver Interface, e.g., USBDI 137 (FIG. 1), a message processor, e.g., message processor 128 (FIG. 1) and/or message processor 158 (FIG. 1), an MA USB host, e.g., MA USB host 130, and/or an MA USB device, e.g., MA USB device 131.

As indicated at block 602, the method may include processing at an MA USB host a request message from an USBDI of a USB host for a real time data transfer to be delivered between the USB host and a USB device EP. For example, controller 124 (FIG. 1) may be configured to cause, trigger, and/or control MA USB host 130 (FIG. 1) to process the request message from USBDI 137 (FIG. 1) of device 102 (FIG. 1) for the real time data transfer to be delivered between device 102 (FIG. 1) and EP 134, 135, 136, 138, and/or 104, e.g., as described above.

As indicated at block 604, the method may include transmitting at least one real time transfer request to an MA USB device of the MA USB PAL based on the request message, a header of the real time transfer request including a request ID field to identify the real time data transfer, and a delivery time field to indicate a delivery time to complete delivery of the real time data transfer. For example, controller 124 (FIG. 1) may be configured to cause, trigger, and/or control MA USB host 130 (FIG. 1) to transmit the at least one real time transfer request to MA USB device 131 (FIG. 1) based on the request message, e.g., as described above.

As indicated at block 606, the method may include sending a response to the USBDI based on a determination that the real time data transfer is not to be completed by the delivery time, the response including an error indication to indicate failure of the real time data transfer. For example, controller 124 (FIG. 1) may be configured to cause, trigger, and/or control MA USB host 130 (FIG. 1) to send the response to USBDI 137 (FIG. 1) based on the determination that the real time data transfer is not to be completed by the delivery time, e.g., as described above.

Figure 7:
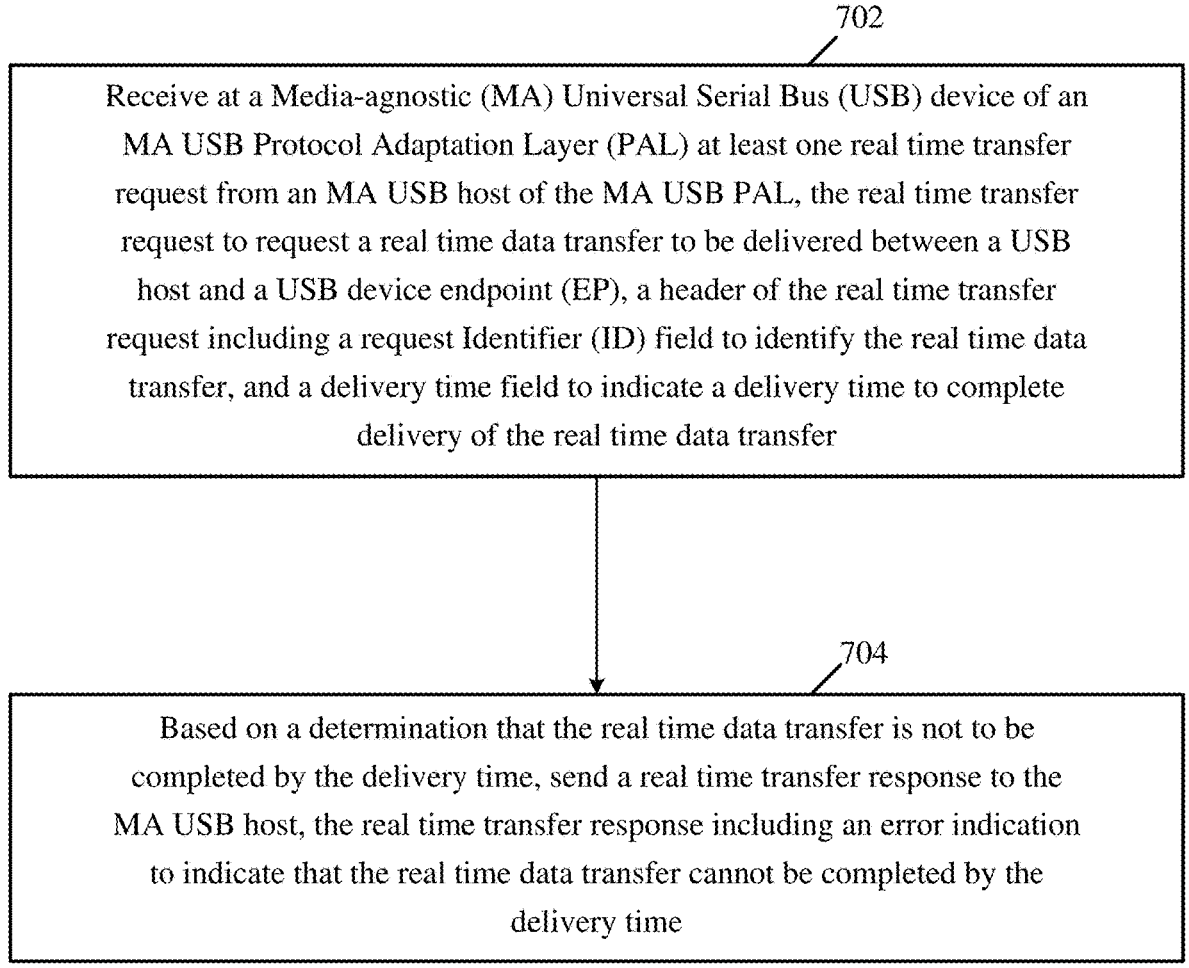
FIG. 7 is a schematic flow-chart illustration of a method of communicating over an MA USB connection, in accordance with some demonstrative embodiments.

Reference is made to FIG. 7, which schematically illustrates a method of communicating over an MA USB connection, in accordance with some demonstrative embodiments. For example, one or more of the operations of the method of FIG. 7 may be performed by one or more elements of a system, e.g., system 100 (FIG. 1), for example, one or more devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), a USB Driver Interface, e.g., USBDI 137 (FIG. 1), a message processor, e.g., message processor 128 (FIG. 1) and/or message processor 158 (FIG. 1), an MA USB host, e.g., MA USB host 130 (FIG. 1), and/or an MA USB device, e.g., MA USB device 131 (FIG. 1).

As indicated at block 702, the method may include receiving at an MA USB device at least one real time transfer request from an MA USB host of an MA USB PAL, the real time transfer request to request a real time data transfer to be delivered between a USB host and a USB device EP, a header of the real time transfer request including a request ID field to identify the real time data transfer, and a delivery time field to indicate a delivery time to complete delivery of the real time data transfer. For example, controller 154 (FIG. 1) may be configured to cause, trigger, and/or control MA USB device 131 (FIG. 1) to receive the at least one real time transfer request from MA USB host 130 (FIG. 1), the real time transfer request to request the real time data transfer to be delivered between device 102 (FIG. 1) and EP 134, 135, 136, 138, and/or 104, e.g., as described above.

As indicated at block 704, the method may include sending a real time transfer response to the MA USB host based on a determination that the real time data transfer is not to be completed by the delivery time, the real time transfer response including an error indication to indicate that the real time data transfer cannot be completed by the delivery time. For example, controller 154 (FIG. 1) may be configured to cause, trigger, and/or control MA USB device 131 (FIG. 1) to send a real time transfer response to MA USB host 130 (FIG. 1) based on the determination that the real time data transfer is not to be completed by the delivery time, e.g., as described above.

Figure 8:
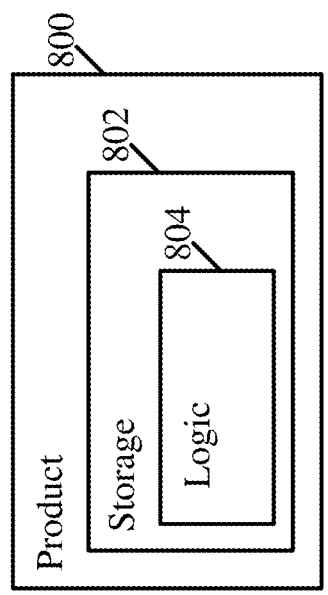
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable ("machine-readable") non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), an MA USB host, e.g., MA USB host 130 (FIG. 1), an MA USB device, e.g., MA USB device 131 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, and/or 7, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 800 and/or machine readable storage media 802 may include one or more types of computer-readable storage media capable of storing data, including volatile memory, non-volatile memory, removable or non-removable memory, erasable or non-erasable memory, writeable or rewriteable memory, and the like. For example, machine readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a Media-agnostic (MA) Universal Serial Bus (USB) host of an MA USB Protocol Adaptation Layer (PAL) to process a request message from a USB Driver Interface (USBDI) of a USB host for a real time data transfer to be delivered between the USB host and a USB device endpoint (EP); based on the request message, transmit at least one real time transfer request to an MA USB device of the MA USB PAL, a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a response to the USBDI, the response comprising an error indication to indicate failure of the real time data transfer.

Example 2 includes the subject matter of Example 1, and optionally, wherein the request message comprises a read request for a real time IN transfer of data to be delivered from the USB device EP to the USB host, the delivery time comprises a time to complete delivery of the data from the USB device EP to the MA USB host.

Example 3 includes the subject matter of Example 2, and optionally, wherein the apparatus is configured to cause the MA USB host to determine that the real time data transfer is not to be completed by the delivery time based on a timeout of the delivery time prior to completing receipt of the data in one or more real time transfer responses from the MA USB device.

Example 4 includes the subject matter of Example 2 or 3, and optionally, wherein the apparatus is configured to cause the MA USB host to determine that the real time data transfer is not to be completed by the delivery time based on an error indication in a real time transfer response from the MA USB device prior to a timeout of the delivery time, the error indication in the real time transfer response to indicate that delivery of the data from the USB device EP cannot be completed before the delivery time.

Example 5 includes the subject matter of Example 4, and optionally, wherein the real time transfer response comprises partial data of the real time IN transfer from the USB device EP.

Example 6 includes the subject matter of any one of Examples 2-5, and optionally, wherein the apparatus is configured to cause the MA USB host to provide to the USBDI partial data of the real time IN transfer, which is received in one or more real time transfer responses from the MA USB device prior to the determination that the real time data transfer is not to be completed by the delivery time.

Example 7 includes the subject matter of any one of Examples 2-6, and optionally, wherein the apparatus is configured to cause the MA USB host to process one or more real time transfer responses from the MA USB device, a real time transfer response comprising at least part of the data of the IN transfer, a header of the real time transfer response comprising the request ID, a delivery time field in the header of the real time transfer response comprising an actual delivery time of a last payload byte from the USB device EP.

Example 8 includes the subject matter of Example 1, and optionally, wherein the request message comprises a read request for a real time OUT data transfer of data to be delivered from the USB host to the USB device EP, the delivery time comprises a time to complete delivery of the data from the MA USB host to the USB device EP.

Example 9 includes the subject matter of Example 8, and optionally, wherein the apparatus is configured to cause the MA USB host to determine that the real time data transfer is not to be completed by the delivery time based on a timeout of the delivery time prior to receipt of a success indication in a real time transfer response from the MA USB device, the success indication to indicate successful delivery of the data to the USB device EP.

Example 10 includes the subject matter of Example 8 or 9, and optionally, wherein the apparatus is configured to cause the MA USB host to determine that the real time data transfer is not to be completed by the delivery time based on an error indication in a real time transfer response from the MA USB device prior to a timeout of the delivery time, the error indication in the real time transfer response to indicate that delivery of the data to the USB device EP cannot be completed before the delivery time.

Example 11 includes the subject matter of Example 10, and optionally, wherein the real time transfer response comprises an indication of partial data of the real time OUT transfer delivered to the USB device EP.

Example 12 includes the subject matter of Example 11, and optionally, wherein the apparatus is configured to cause the MA USB host to include in the response to the USBDI an indication of the partial data of the real time OUT transfer delivered to the USB device EP.

Example 13 includes the subject matter of any one of Examples 1-12, and optionally, wherein the apparatus is configured to cause the MA USB host to determine that the real time data transfer is not to be completed by the delivery time based on an out of order real time transfer response comprising at least one of an out of order request ID, or an out of order sequence number.

Example 14 includes the subject matter of any one of Examples 1-13, and optionally, wherein the apparatus is configured to cause the MA USB host to terminate the real time data transfer based on the determination that the real time data transfer is not to be completed by the delivery time.

Example 15 includes the subject matter of any one of Examples 1-14, and optionally, wherein the header of the real time transfer request comprises a budget field to indicate a time budget remaining from a generation time of the real time transfer request to the delivery time.

Example 16 includes the subject matter of any one of Examples 1-15, and optionally, wherein the apparatus is configured to allow the MA USB host to transmit the real time transfer request to the MA USB device based on a real time bulk capability indication in an MA USB capability response from the MA USB device, the real time bulk capability indication to indicate support of real time bulk transfers.

Example 17 includes the subject matter of any one of Examples 1-16, and optionally, wherein the apparatus is configured to cause the MA USB host to transmit to the MA USB device an EP handle request message comprising an indication that the USB device EP is to be used for real time bulk transfers.

Example 18 includes the subject matter of any one of Examples 1-17, and optionally, comprising a communication interface to communicate with the MA USB device.

Example 19 includes the subject matter of any one of Examples 1-18, and optionally, comprising a radio to communicate with the MA USB device over a wireless communication medium.

Example 20 includes the subject matter of any one of Examples 1-19, and optionally, comprising a processor and a memory.

Example 21 includes a system of Media-agnostic (MA) Universal Serial Bus (USB) communication comprising a USB host, the USB host comprising a memory; a processor; a communication interface to communicate with an MA USB device of an MA USB Protocol Adaptation Layer (PAL); and a controller configured to cause an MA USB host of the MA USB PAL to process a request message from a USB Driver Interface (USBDI) of the USB host for a real time data transfer to be delivered between the USB host and a USB device endpoint (EP); based on the request message, transmit at least one real time transfer request to the MA USB device, a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a response to the USBDI, the response comprising an error indication to indicate failure of the real time data transfer.

Example 22 includes the subject matter of Example 21, and optionally, wherein the request message comprises a read request for a real time IN transfer of data to be delivered from the USB device EP to the USB host, the delivery time comprises a time to complete delivery of the data from the USB device EP to the MA USB host.

Example 23 includes the subject matter of Example 22, and optionally, wherein the controller is configured to cause the MA USB host to determine that the real time data transfer is not to be completed by the delivery time based on a timeout of the delivery time prior to completing receipt of the data in one or more real time transfer responses from the MA USB device.

Example 24 includes the subject matter of Example 22 or 23, and optionally, wherein the controller is configured to cause the MA USB host to determine that the real time data transfer is not to be completed by the delivery time based on an error indication in a real time transfer response from the MA USB device prior to a timeout of the delivery time, the error indication in the real time transfer response to indicate that delivery of the data from the USB device EP cannot be completed before the delivery time.

Example 25 includes the subject matter of Example 24, and optionally, wherein the real time transfer response comprises partial data of the real time IN transfer from the USB device EP.

Example 26 includes the subject matter of any one of Examples 22-25, and optionally, wherein the controller is configured to cause the MA USB host to provide to the USBDI partial data of the real time IN transfer, which is received in one or more real time transfer responses from the MA USB device prior to the determination that the real time data transfer is not to be completed by the delivery time.

Example 27 includes the subject matter of any one of Examples 22-26, and optionally, wherein the controller is configured to cause the MA USB host to process one or more real time transfer responses from the MA USB device, a real time transfer response comprising at least part of the data of the IN transfer, a header of the real time transfer response comprising the request ID, a delivery time field in the header of the real time transfer response comprising an actual delivery time of a last payload byte from the USB device EP.

Example 28 includes the subject matter of Example 21, and optionally, wherein the request message comprises a read request for a real time OUT data transfer of data to be delivered from the USB host to the USB device EP, the delivery time comprises a time to complete delivery of the data from the MA USB host to the USB device EP.

Example 29 includes the subject matter of Example 28, and optionally, wherein the controller is configured to cause the MA USB host to determine that the real time data transfer is not to be completed by the delivery time based on a timeout of the delivery time prior to receipt of a success indication in a real time transfer response from the MA USB device, the success indication to indicate successful delivery of the data to the USB device EP.

Example 30 includes the subject matter of Example 28 or 29, and optionally, wherein the controller is configured to cause the MA USB host to determine that the real time data transfer is not to be completed by the delivery time based on an error indication in a real time transfer response from the MA USB device prior to a timeout of the delivery time, the error indication in the real time transfer response to indicate that delivery of the data to the USB device EP cannot be completed before the delivery time.

Example 31 includes the subject matter of Example 30, and optionally, wherein the real time transfer response comprises an indication of partial data of the real time OUT transfer delivered to the USB device EP.

Example 32 includes the subject matter of Example 31, and optionally, wherein the controller is configured to cause the MA USB host to include in the response to the USBDI an indication of the partial data of the real time OUT transfer delivered to the USB device EP.

Example 33 includes the subject matter of any one of Examples 21-32, and optionally, wherein the controller is configured to cause the MA USB host to determine that the real time data transfer is not to be completed by the delivery time based on an out of order real time transfer response comprising at least one of an out of order request ID, or an out of order sequence number.

Example 34 includes the subject matter of any one of Examples 21-33, and optionally, wherein the controller is configured to cause the MA USB host to terminate the real time data transfer based on the determination that the real time data transfer is not to be completed by the delivery time.

Example 35 includes the subject matter of any one of Examples 21-34, and optionally, wherein the header of the real time transfer request comprises a budget field to indicate a time budget remaining from a generation time of the real time transfer request to the delivery time.

Example 36 includes the subject matter of any one of Examples 21-35, and optionally, wherein the controller is configured to allow the MA USB host to transmit the real time transfer request to the MA USB device based on a real time bulk capability indication in an MA USB capability response from the MA USB device, the real time bulk capability indication to indicate support of real time bulk transfers.

Example 37 includes the subject matter of any one of Examples 21-36, and optionally, wherein the controller is configured to cause the MA USB host to transmit to the MA USB device an EP handle request message comprising an indication that the USB device EP is to be used for real time bulk transfers.

Example 38 includes a method to be performed at a Media-agnostic (MA) Universal Serial Bus (USB) host of an MA USB Protocol Adaptation Layer (PAL), the method comprising processing a request message from a USB Driver Interface (USBDI) of a USB host for a real time data transfer to be delivered between the USB host and a USB device endpoint (EP); based on the request message, transmitting at least one real time transfer request to an MA USB device of the MA USB PAL, a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, sending a response to the USBDI, the response comprising an error indication to indicate failure of the real time data transfer.

Example 39 includes the subject matter of Example 38, and optionally, wherein the request message comprises a read request for a real time IN transfer of data to be delivered from the USB device EP to the USB host, the delivery time comprises a time to complete delivery of the data from the USB device EP to the MA USB host.

Example 40 includes the subject matter of Example 39, and optionally, comprising determining that the real time data transfer is not to be completed by the delivery time based on a timeout of the delivery time prior to completing receipt of the data in one or more real time transfer responses from the MA USB device.

Example 41 includes the subject matter of Example 39 or 40, and optionally, comprising determining that the real time data transfer is not to be completed by the delivery time based on an error indication in a real time transfer response from the MA USB device prior to a timeout of the delivery time, the error indication in the real time transfer response to indicate that delivery of the data from the USB device EP cannot be completed before the delivery time.

Example 42 includes the subject matter of Example 41, and optionally, wherein the real time transfer response comprises partial data of the real time IN transfer from the USB device EP.

Example 43 includes the subject matter of any one of Examples 39-42, and optionally, comprising providing to the USBDI partial data of the real time IN transfer, which is received in one or more real time transfer responses from the MA USB device prior to the determination that the real time data transfer is not to be completed by the delivery time.

Example 44 includes the subject matter of any one of Examples 39-43, and optionally, comprising processing one or more real time transfer responses from the MA USB device, a real time transfer response comprising at least part of the data of the IN transfer, a header of the real time transfer response comprising the request ID, a delivery time field in the header of the real time transfer response comprising an actual delivery time of a last payload byte from the USB device EP.

Example 45 includes the subject matter of Example 38, and optionally, wherein the request message comprises a read request for a real time OUT data transfer of data to be delivered from the USB host to the USB device EP, the delivery time comprises a time to complete delivery of the data from the MA USB host to the USB device EP.

Example 46 includes the subject matter of Example 45, and optionally, comprising determining that the real time data transfer is not to be completed by the delivery time based on a timeout of the delivery time prior to receipt of a success indication in a real time transfer response from the MA USB device, the success indication to indicate successful delivery of the data to the USB device EP.

Example 47 includes the subject matter of Example 45 or 46, and optionally, comprising determining that the real time data transfer is not to be completed by the delivery time based on an error indication in a real time transfer response from the MA USB device prior to a timeout of the delivery time, the error indication in the real time transfer response to indicate that delivery of the data to the USB device EP cannot be completed before the delivery time.

Example 48 includes the subject matter of Example 47, and optionally, wherein the real time transfer response comprises an indication of partial data of the real time OUT transfer delivered to the USB device EP.

Example 49 includes the subject matter of Example 48, and optionally, comprising including in the response to the USBDI an indication of the partial data of the real time OUT transfer delivered to the USB device EP.

Example 50 includes the subject matter of any one of Examples 38-49, and optionally, comprising determining that the real time data transfer is not to be completed by the delivery time based on an out of order real time transfer response comprising at least one of an out of order request ID, or an out of order sequence number.

Example 51 includes the subject matter of any one of Examples 38-50, and optionally, comprising terminating the real time data transfer based on the determination that the real time data transfer is not to be completed by the delivery time.

Example 52 includes the subject matter of any one of Examples 38-51, and optionally, wherein the header of the real time transfer request comprises a budget field to indicate a time budget remaining from a generation time of the real time transfer request to the delivery time.

Example 53 includes the subject matter of any one of Examples 38-52, and optionally, comprising allowing the MA USB host to transmit the real time transfer request to the MA USB device based on a real time bulk capability indication in an MA USB capability response from the MA USB device, the real time bulk capability indication to indicate support of real time bulk transfers.

Example 54 includes the subject matter of any one of Examples 38-53, and optionally, comprising transmitting to the MA USB device an EP handle request message comprising an indication that the USB device EP is to be used for real time bulk transfers.

Example 55 includes a product comprising one or more tangible computer-readable non-transitory storage media comprising computer-executable instructions operable to, when executed by at least one processor, enable the at least one processor to cause a Media-agnostic (MA) Universal Serial Bus (USB) host of an MA USB Protocol Adaptation Layer (PAL) to process a request message from a USB Driver Interface (USBDI) of a USB host for a real time data transfer to be delivered between the USB host and a USB device endpoint (EP); based on the request message, transmit at least one real time transfer request to an MA USB device of the MA USB PAL, a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a response to the USBDI, the response comprising an error indication to indicate failure of the real time data transfer.

Example 56 includes the subject matter of Example 55, and optionally, wherein the request message comprises a read request for a real time IN transfer of data to be delivered from the USB device EP to the USB host, the delivery time comprises a time to complete delivery of the data from the USB device EP to the MA USB host.

Example 57 includes the subject matter of Example 56, and optionally, wherein the instructions, when executed, cause the MA USB host to determine that the real time data transfer is not to be completed by the delivery time based on a timeout of the delivery time prior to completing receipt of the data in one or more real time transfer responses from the MA USB device.

Example 58 includes the subject matter of Example 56 or 57, and optionally, wherein the instructions, when executed, cause the MA USB host to determine that the real time data transfer is not to be completed by the delivery time based on an error indication in a real time transfer response from the MA USB device prior to a timeout of the delivery time, the error indication in the real time transfer response to indicate that delivery of the data from the USB device EP cannot be completed before the delivery time.

Example 59 includes the subject matter of Example 58, and optionally, wherein the real time transfer response comprises partial data of the real time IN transfer from the USB device EP.

Example 60 includes the subject matter of any one of Examples 56-59, and optionally, wherein the instructions, when executed, cause the MA USB host to provide to the USBDI partial data of the real time IN transfer, which is received in one or more real time transfer responses from the MA USB device prior to the determination that the real time data transfer is not to be completed by the delivery time.

Example 61 includes the subject matter of any one of Examples 56-60, and optionally, wherein the instructions, when executed, cause the MA USB host to process one or more real time transfer responses from the MA USB device, a real time transfer response comprising at least part of the data of the IN transfer, a header of the real time transfer response comprising the request ID, a delivery time field in the header of the real time transfer response comprising an actual delivery time of a last payload byte from the USB device EP.

Example 62 includes the subject matter of Example 55, and optionally, wherein the request message comprises a read request for a real time OUT data transfer of data to be delivered from the USB host to the USB device EP, the delivery time comprises a time to complete delivery of the data from the MA USB host to the USB device EP.

Example 63 includes the subject matter of Example 62, and optionally, wherein the instructions, when executed, cause the MA USB host to determine that the real time data transfer is not to be completed by the delivery time based on a timeout of the delivery time prior to receipt of a success indication in a real time transfer response from the MA USB device, the success indication to indicate successful delivery of the data to the USB device EP.

Example 64 includes the subject matter of Example 62 or 63, and optionally, wherein the instructions, when executed, cause the MA USB host to determine that the real time data transfer is not to be completed by the delivery time based on an error indication in a real time transfer response from the MA USB device prior to a timeout of the delivery time, the error indication in the real time transfer response to indicate that delivery of the data to the USB device EP cannot be completed before the delivery time.

Example 65 includes the subject matter of Example 64, and optionally, wherein the real time transfer response comprises an indication of partial data of the real time OUT transfer delivered to the USB device EP.

Example 66 includes the subject matter of Example 65, and optionally, wherein the instructions, when executed, cause the MA USB host to include in the response to the USBDI an indication of the partial data of the real time OUT transfer delivered to the USB device EP.

Example 67 includes the subject matter of any one of Examples 55-66, and optionally, wherein the instructions, when executed, cause the MA USB host to determine that the real time data transfer is not to be completed by the delivery time based on an out of order real time transfer response comprising at least one of an out of order request ID, or an out of order sequence number.

Example 68 includes the subject matter of any one of Examples 55-67, and optionally, wherein the instructions, when executed, cause the MA USB host to terminate the real time data transfer based on the determination that the real time data transfer is not to be completed by the delivery time.

Example 69 includes the subject matter of any one of Examples 55-68, and optionally, wherein the header of the real time transfer request comprises a budget field to indicate a time budget remaining from a generation time of the real time transfer request to the delivery time.

Example 70 includes the subject matter of any one of Examples 55-69, and optionally, wherein the instructions, when executed, allow the MA USB host to transmit the real time transfer request to the MA USB device based on a real time bulk capability indication in an MA USB capability response from the MA USB device, the real time bulk capability indication to indicate support of real time bulk transfers.

Example 71 includes the subject matter of any one of Examples 55-70, and optionally, wherein the instructions, when executed, cause the MA USB host to transmit to the MA USB device an EP handle request message comprising an indication that the USB device EP is to be used for real time bulk transfers.

Example 72 includes an apparatus of Media-agnostic (MA) communication by an MA Universal Serial Bus (USB) host of an MA USB Protocol Adaptation Layer (PAL), the apparatus comprising means for processing a request message from a USB Driver Interface (USBDI) of a USB host for a real time data transfer to be delivered between the USB host and a USB device endpoint (EP); means for, based on the request message, transmitting at least one real time transfer request to an MA USB device of the MA USB PAL, a header of the real time transfer request comprising a request Identifier (ID) field to identify the real time data transfer, and a delivery time field to indicate a delivery time to complete delivery of the real time data transfer; and means for, based on a determination that the real time data transfer is not to be completed by the delivery time, sending a response to the USBDI, the response comprising an error indication to indicate failure of the real time data transfer.

Example 73 includes the subject matter of Example 72, and optionally, wherein the request message comprises a read request for a real time IN transfer of data to be delivered from the USB device EP to the USB host, the delivery time comprises a time to complete delivery of the data from the USB device EP to the MA USB host.

Example 74 includes the subject matter of Example 73, and optionally, comprising means for determining that the real time data transfer is not to be completed by the delivery time based on a timeout of the delivery time prior to completing receipt of the data in one or more real time transfer responses from the MA USB device.

Example 75 includes the subject matter of Example 73 or 74, and optionally, comprising means for determining that the real time data transfer is not to be completed by the delivery time based on an error indication in a real time transfer response from the MA USB device prior to a timeout of the delivery time, the error indication in the real time transfer response to indicate that delivery of the data from the USB device EP cannot be completed before the delivery time.

Example 76 includes the subject matter of Example 75, and optionally, wherein the real time transfer response comprises partial data of the real time IN transfer from the USB device EP.

Example 77 includes the subject matter of any one of Examples 73-76, and optionally, comprising means for providing to the USBDI partial data of the real time IN transfer, which is received in one or more real time transfer responses from the MA USB device prior to the determination that the real time data transfer is not to be completed by the delivery time.

Example 78 includes the subject matter of any one of Examples 73-77, and optionally, comprising means for processing one or more real time transfer responses from the MA USB device, a real time transfer response comprising at least part of the data of the IN transfer, a header of the real time transfer response comprising the request ID, a delivery time field in the header of the real time transfer response comprising an actual delivery time of a last payload byte from the USB device EP.

Example 79 includes the subject matter of Example 72, and optionally, wherein the request message comprises a read request for a real time OUT data transfer of data to be delivered from the USB host to the USB device EP, the delivery time comprises a time to complete delivery of the data from the MA USB host to the USB device EP.

Example 80 includes the subject matter of Example 79, and optionally, comprising means for determining that the real time data transfer is not to be completed by the delivery time based on a timeout of the delivery time prior to receipt of a success indication in a real time transfer response from the MA USB device, the success indication to indicate successful delivery of the data to the USB device EP.

Example 81 includes the subject matter of Example 79 or 80, and optionally, comprising means for determining that the real time data transfer is not to be completed by the delivery time based on an error indication in a real time transfer response from the MA USB device prior to a timeout of the delivery time, the error indication in the real time transfer response to indicate that delivery of the data to the USB device EP cannot be completed before the delivery time.

Example 82 includes the subject matter of Example 81, and optionally, wherein the real time transfer response comprises an indication of partial data of the real time OUT transfer delivered to the USB device EP.

Example 83 includes the subject matter of Example 82, and optionally, comprising means for including in the response to the USBDI an indication of the partial data of the real time OUT transfer delivered to the USB device EP.

Example 84 includes the subject matter of any one of Examples 72-83, and optionally, comprising means for determining that the real time data transfer is not to be completed by the delivery time based on an out of order real time transfer response comprising at least one of an out of order request ID, or an out of order sequence number.

Example 85 includes the subject matter of any one of Examples 72-84, and optionally, comprising means for terminating the real time data transfer based on the determination that the real time data transfer is not to be completed by the delivery time.

Example 86 includes the subject matter of any one of Examples 72-85, and optionally, wherein the header of the real time transfer request comprises a budget field to indicate a time budget remaining from a generation time of the real time transfer request to the delivery time.

Example 87 includes the subject matter of any one of Examples 72-86, and optionally, comprising means for allowing the MA USB host to transmit the real time transfer request to the MA USB device based on a real time bulk capability indication in an MA USB capability response from the MA USB device, the real time bulk capability indication to indicate support of real time bulk transfers.

Example 88 includes the subject matter of any one of Examples 72-87, and optionally, comprising means for transmitting to the MA USB device an EP handle request message comprising an indication that the USB device EP is to be used for real time bulk transfers.

Example 89 includes an apparatus comprising logic and circuitry configured to cause a Media-agnostic (MA) Universal Serial Bus (USB) device of an MA USB Protocol Adaptation Layer (PAL) to receive at least one real time transfer request from an MA USB host of the MA USB PAL, the real time transfer request to request a real time data transfer to be delivered between a USB host and a USB device endpoint (EP), a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a real time transfer response to the MA USB host, the real time transfer response comprising an error indication to indicate that the real time data transfer cannot be completed by the delivery time.

Example 90 includes the subject matter of Example 89, and optionally, wherein the real time transfer request comprises a request for a real time IN transfer of data to be delivered from the USB device EP to the USB host, the delivery time comprises a time to complete delivery of the data from the USB device EP to the MA USB host.

Example 91 includes the subject matter of Example 90, and optionally, wherein the apparatus is configured to cause the MA USB device to include in the real time transfer response partial data of the real time IN transfer from the USB device EP.

Example 92 includes the subject matter of Example 90 or 91, and optionally, wherein the apparatus is configured to cause the MA USB device to transmit to the MA USB host one or more real time transfer responses comprising at least part of the data of the IN transfer, a header of the one or more real time transfer responses comprising the request ID, a delivery time field in the header of the one or more real time transfer responses comprising an actual delivery time of a last payload byte from the USB device EP.

Example 93 includes the subject matter of Example 89, and optionally, wherein the real time transfer request comprises a request for a real time OUT transfer of data to be delivered from the USB host to the USB device EP, the delivery time comprises a time to complete delivery of the data from the USB host to the USB device EP.

Example 94 includes the subject matter of Example 93, and optionally, wherein the apparatus is configured to cause the MA USB device to include in the real time transfer response an indication of partial data of the real time OUT transfer delivered to the USB device EP.

Example 95 includes the subject matter of any one of Examples 89-94, and optionally, wherein the apparatus is configured to cause the MA USB device to transmit to the MA USB host one or more real time transfer responses comprising a header comprising the request ID and a budget field to indicate a time budget remaining from a generation time of a real time transfer response carrying the budget field to the delivery time.

Example 96 includes the subject matter of any one of Examples 89-95, and optionally, wherein the apparatus is configured to cause the MA USB device to include a real time bulk capability indication in an MA USB capability response to the MA USB host, the real time bulk capability indication to indicate support of real time bulk transfers.

Example 97 includes the subject matter of any one of Examples 89-96, and optionally, wherein the apparatus is configured to cause the MA USB device to process an EP handle request message from the MA USB host comprising an indication that the USB device EP is to be used for real time bulk transfers.

Example 98 includes the subject matter of any one of Examples 89-97, and optionally, comprising a communication interface to communicate with the MA USB host.

Example 99 includes the subject matter of any one of Examples 89-98, and optionally, comprising a radio to communicate with the MA USB host over a wireless communication medium.

Example 100 includes the subject matter of any one of Examples 89-99, and optionally, comprising a processor and a memory.

Example 101 includes a system of Media-agnostic (MA) Universal Serial Bus (USB) communication comprising a USB device, the USB device comprising a memory; a processor; a communication interface to communicate with an MA USB host of an MA USB Protocol Adaptation Layer (PAL); and a controller configured to cause an MA USB device of the MA USB PAL to receive at least one real time transfer request from the MA USB host, the real time transfer request to request a real time data transfer to be delivered between a USB host and the USB device endpoint (EP), a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a real time transfer response to the MA USB host, the real time transfer response comprising an error indication to indicate that the real time data transfer cannot be completed by the delivery time.

Example 102 includes the subject matter of Example 101, and optionally, wherein the real time transfer request comprises a request for a real time IN transfer of data to be delivered from the USB device EP to the USB host, the delivery time comprises a time to complete delivery of the data from the USB device EP to the MA USB host.

Example 103 includes the subject matter of Example 102, and optionally, wherein the controller is configured to cause the MA USB device to include in the real time transfer response partial data of the real time IN transfer from the USB device EP.

Example 104 includes the subject matter of Example 102 or 103, and optionally, wherein the controller is configured to cause the MA USB device to transmit to the MA USB host one or more real time transfer responses comprising at least part of the data of the IN transfer, a header of the one or more real time transfer responses comprising the request ID, a delivery time field in the header of the one or more real time transfer responses comprising an actual delivery time of a last payload byte from the USB device EP.

Example 105 includes the subject matter of Example 101, and optionally, wherein the real time transfer request comprises a request for a real time OUT transfer of data to be delivered from the USB host to the USB device EP, the delivery time comprises a time to complete delivery of the data from the USB host to the USB device EP.

Example 106 includes the subject matter of Example 105, and optionally, wherein the controller is configured to cause the MA USB device to include in the real time transfer response an indication of partial data of the real time OUT transfer delivered to the USB device EP.

Example 107 includes the subject matter of any one of Examples 101-106, and optionally, wherein the controller is configured to cause the MA USB device to transmit to the MA USB host one or more real time transfer responses comprising a header comprising the request ID and a budget field to indicate a time budget remaining from a generation time of a real time transfer response carrying the budget field to the delivery time.

Example 108 includes the subject matter of any one of Examples 101-107, and optionally, wherein the controller is configured to cause the MA USB device to include a real time bulk capability indication in an MA USB capability response to the MA USB host, the real time bulk capability indication to indicate support of real time bulk transfers.

Example 109 includes the subject matter of any one of Examples 101-108, and optionally, wherein the controller is configured to cause the MA USB device to process an EP handle request message from the MA USB host comprising an indication that the USB device EP is to be used for real time bulk transfers.

Example 110 includes a method to be performed at a Media-agnostic (MA) Universal Serial Bus (USB) device of an MA USB Protocol Adaptation Layer (PAL), the method comprising receiving at least one real time transfer request from an MA USB host of the MA USB PAL, the real time transfer request to request a real time data transfer to be delivered between a USB host and a USB device endpoint (EP), a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, sending a real time transfer response to the MA USB host, the real time transfer response comprising an error indication to indicate that the real time data transfer cannot be completed by the delivery time.

Example 111 includes the subject matter of Example 110, and optionally, wherein the real time transfer request comprises a request for a real time IN transfer of data to be delivered from the USB device EP to the USB host, the delivery time comprises a time to complete delivery of the data from the USB device EP to the MA USB host.

Example 112 includes the subject matter of Example 111, and optionally, comprising including in the real time transfer response partial data of the real time IN transfer from the USB device EP.

Example 113 includes the subject matter of Example 111 or 112, and optionally, comprising transmitting to the MA USB host one or more real time transfer responses comprising at least part of the data of the IN transfer, a header of the one or more real time transfer responses comprising the request ID, a delivery time field in the header of the one or more real time transfer responses comprising an actual delivery time of a last payload byte from the USB device EP.

Example 114 includes the subject matter of Example 110, and optionally, wherein the real time transfer request comprises a request for a real time OUT transfer of data to be delivered from the USB host to the USB device EP, the delivery time comprises a time to complete delivery of the data from the USB host to the USB device EP.

Example 115 includes the subject matter of Example 114, and optionally, comprising including in the real time transfer response an indication of partial data of the real time OUT transfer delivered to the USB device EP.

Example 116 includes the subject matter of any one of Examples 110-115, and optionally, comprising transmitting to the MA USB host one or more real time transfer responses comprising a header comprising the request ID and a budget field to indicate a time budget remaining from a generation time of a real time transfer response carrying the budget field to the delivery time.

Example 117 includes the subject matter of any one of Examples 110-116, and optionally, comprising including a real time bulk capability indication in an MA USB capability response to the MA USB host, the real time bulk capability indication to indicate support of real time bulk transfers.

Example 118 includes the subject matter of any one of Examples 110-117, and optionally, comprising processing an EP handle request message from the MA USB host comprising an indication that the USB device EP is to be used for real time bulk transfers.

Example 119 includes a product comprising one or more tangible computer-readable non-transitory storage media comprising computer-executable instructions operable to, when executed by at least one processor, enable the at least one processor to cause a Media-agnostic (MA) Universal Serial Bus (USB) device of an MA USB Protocol Adaptation Layer (PAL) to receive at least one real time transfer request from an MA USB host of the MA USB PAL, the real time transfer request to request a real time data transfer to be delivered between a USB host and a USB device endpoint (EP), a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a real time transfer response to the MA USB host, the real time transfer response comprising an error indication to indicate that the real time data transfer cannot be completed by the delivery time.

Example 120 includes the subject matter of Example 119, and optionally, wherein the real time transfer request comprises a request for a real time IN transfer of data to be delivered from the USB device EP to the USB host, the delivery time comprises a time to complete delivery of the data from the USB device EP to the MA USB host.

Example 121 includes the subject matter of Example 120, and optionally, wherein the instructions, when executed, cause the MA USB device to include in the real time transfer response partial data of the real time IN transfer from the USB device EP.

Example 122 includes the subject matter of Example 120 or 121, and optionally, wherein the instructions, when executed, cause the MA USB device to transmit to the MA USB host one or more real time transfer responses comprising at least part of the data of the IN transfer, a header of the one or more real time transfer responses comprising the request ID, a delivery time field in the header of the one or more real time transfer responses comprising an actual delivery time of a last payload byte from the USB device EP.

Example 123 includes the subject matter of Example 119, and optionally, wherein the real time transfer request comprises a request for a real time OUT transfer of data to be delivered from the USB host to the USB device EP, the delivery time comprises a time to complete delivery of the data from the USB host to the USB device EP.

Example 124 includes the subject matter of Example 123, and optionally, wherein the instructions, when executed, cause the MA USB device to include in the real time transfer response an indication of partial data of the real time OUT transfer delivered to the USB device EP.

Example 125 includes the subject matter of any one of Examples 119-124, and optionally, wherein the instructions, when executed, cause the MA USB device to transmit to the MA USB host one or more real time transfer responses comprising a header comprising the request ID and a budget field to indicate a time budget remaining from a generation time of a real time transfer response carrying the budget field to the delivery time.

Example 126 includes the subject matter of any one of Examples 119-125, and optionally, wherein the instructions, when executed, cause the MA USB device to include a real time bulk capability indication in an MA USB capability response to the MA USB host, the real time bulk capability indication to indicate support of real time bulk transfers.

Example 127 includes the subject matter of any one of Examples 119-126, and optionally, wherein the instructions, when executed, cause the MA USB device to process an EP handle request message from the MA USB host comprising an indication that the USB device EP is to be used for real time bulk transfers.

Example 128 includes an apparatus of Media-agnostic (MA) communication by an MA Universal Serial Bus (USB) device of an MA USB Protocol Adaptation Layer (PAL), the apparatus comprising means for receiving at least one real time transfer request from an MA USB host of the MA USB PAL, the real time transfer request to request a real time data transfer to be delivered between a USB host and a USB device endpoint (EP), a header of the real time transfer request comprising a request Identifier (ID) field to identify the real time data transfer, and a delivery time field to indicate a delivery time to complete delivery of the real time data transfer; and means for, based on a determination that the real time data transfer is not to be completed by the delivery time, sending a real time transfer response to the MA USB host, the real time transfer response comprising an error indication to indicate that the real time data transfer cannot be completed by the delivery time.

Example 129 includes the subject matter of Example 128, and optionally, wherein the real time transfer request comprises a request for a real time IN transfer of data to be delivered from the USB device EP to the USB host, the delivery time comprises a time to complete delivery of the data from the USB device EP to the MA USB host.

Example 130 includes the subject matter of Example 129, and optionally, comprising means for including in the real time transfer response partial data of the real time IN transfer from the USB device EP.

Example 131 includes the subject matter of Example 129 or 130, and optionally, comprising means for transmitting to the MA USB host one or more real time transfer responses comprising at least part of the data of the IN transfer, a header of the one or more real time transfer responses comprising the request ID, a delivery time field in the header of the one or more real time transfer responses comprising an actual delivery time of a last payload byte from the USB device EP.

Example 132 includes the subject matter of Example 128, and optionally, wherein the real time transfer request comprises a request for a real time OUT transfer of data to be delivered from the USB host to the USB device EP, the delivery time comprises a time to complete delivery of the data from the USB host to the USB device EP.

Example 133 includes the subject matter of Example 132, and optionally, comprising means for including in the real time transfer response an indication of partial data of the real time OUT transfer delivered to the USB device EP.

Example 134 includes the subject matter of any one of Examples 128-133, and optionally, comprising means for transmitting to the MA USB host one or more real time transfer responses comprising a header comprising the request ID and a budget field to indicate a time budget remaining from a generation time of a real time transfer response carrying the budget field to the delivery time.

Example 135 includes the subject matter of any one of Examples 128-134, and optionally, comprising means for including a real time bulk capability indication in an MA USB capability response to the MA USB host, the real time bulk capability indication to indicate support of real time bulk transfers.

Example 136 includes the subject matter of any one of Examples 128-135, and optionally, comprising means for processing an EP handle request message from the MA USB host comprising an indication that the USB device EP is to be used for real time bulk transfers.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
    a processor comprising logic and circuitry configured to cause a Media-agnostic (MA) Universal Serial Bus (USB) host of an MA USB Protocol Adaptation Layer (PAL) to communicate with an MA USB device of the MA USB PAL, the MA USB PAL to connect between a USB device and a USB host, the processor configured to cause the MA USB host to:
        process a request message from a USB Driver Interface (USBDI) of the USB host for a real time data transfer to be delivered between the USB host and a USB device endpoint (EP) corresponding to the USB device;
        based on the request message, transmit at least one real time transfer request to the MA USB device, a header of the real time transfer request comprising a request Identifier (ID) field to identify the real time data transfer, and a delivery time field to indicate a delivery time to complete delivery of the real time data transfer; and
        based on a determination that the real time data transfer is not to be completed by the delivery time, send a response to the USBDI, the response comprising an error indication to indicate failure of the real time data transfer; and
    a memory to store information processed by the processor.

2. The apparatus of claim 1, wherein the request message comprises a read request for a real time IN transfer of data to be delivered from the USB device EP to the USB host, the delivery time comprises a time to complete delivery of the data from the USB device EP to the MA USB host.

3. The apparatus of claim 2 configured to cause the MA USB host to determine that the real time data transfer is not to be completed by the delivery time based on a timeout of the delivery time prior to completing receipt of the data in one or more real time transfer responses from the MA USB device.

4. The apparatus of claim 2 configured to cause the MA USB host to determine that the real time data transfer is not to be completed by the delivery time based on an error indication in a real time transfer response from the MA USB device prior to a timeout of the delivery time, the error indication in the real time transfer response to indicate that delivery of the data from the USB device EP cannot be completed before the delivery time.

5. The apparatus of claim 4, wherein the real time transfer response comprises partial data of the real time IN transfer from the USB device EP.

6. The apparatus of claim 2 configured to cause the MA USB host to provide to the USBDI partial data of the real time IN transfer, which is received in one or more real time transfer responses from the MA USB device prior to the determination that the real time data transfer is not to be completed by the delivery time.

7. The apparatus of claim 2 configured to cause the MA USB host to process one or more real time transfer responses from the MA USB device, a real time transfer response comprising at least part of the data of the real time IN transfer, a header of the real time transfer response comprising the request ID field, a delivery time field in the header of the real time transfer response comprising an actual delivery time of a last payload byte from the USB device EP.

8. The apparatus of claim 1, wherein the request message comprises a read request for a real time OUT transfer of data to be delivered from the USB host to the USB device EP, the delivery time comprises a time to complete delivery of the data from the MA USB host to the USB device EP.

9. The apparatus of claim 8 configured to cause the MA USB host to determine that the real time data transfer is not to be completed by the delivery time based on a timeout of the delivery time prior to receipt of a success indication in a real time transfer response from the MA USB device, the success indication to indicate successful delivery of the data to the USB device EP.

10. The apparatus of claim 8 configured to cause the MA USB host to determine that the real time data transfer is not to be completed by the delivery time based on an error indication in a real time transfer response from the MA USB device prior to a timeout of the delivery time, the error indication in the real time transfer response to indicate that delivery of the data to the USB device EP cannot be completed before the delivery time.

11. The apparatus of claim 10, wherein the real time transfer response comprises an indication of partial data of the real time OUT transfer delivered to the USB device EP.

12. The apparatus of claim 11 configured to cause the MA USB host to include in the response to the USBDI an indication of the partial data of the real time OUT transfer delivered to the USB device EP.

13. The apparatus of claim 1 configured to cause the MA USB host to determine that the real time data transfer is not to be completed by the delivery time based on an out of order real time transfer response comprising at least one of an out of order request ID, or an out of order sequence number.

14. The apparatus of claim 1 configured to cause the MA USB host to terminate the real time data transfer based on the determination that the real time data transfer is not to be completed by the delivery time.

15. The apparatus of claim 1 configured to allow the MA USB host to transmit the real time transfer request to the MA USB device based on a real time bulk capability indication in an MA USB capability response from the MA USB device, the real time bulk capability indication to indicate support of real time bulk transfers.

16. The apparatus of claim 1 comprising a communication interface to communicate with the MA USB device.

17. The apparatus of claim 16 comprising another processor to execute instructions of an operating system.

18. A product comprising one or more tangible computer-readable non-transitory storage media comprising computer-executable instructions operable to, when executed by at least one processor, enable the at least one processor to cause a Media-agnostic (MA) Universal Serial Bus (USB) host of an MA USB Protocol Adaptation Layer (PAL) to communicate with an MA USB device of the MA USB PAL, the MA USB PAL to connect between a USB device and a USB host, the instructions, when executed, cause the MA USB host to:

process a request message from a USB Driver Interface (USBDI) of the USB host for a real time data transfer to be delivered between the USB host and a USB device endpoint (EP) corresponding to the USB device;

based on the request message, transmit at least one real time transfer request to the MA USB device a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a response to the USBDI, the response comprising an error indication to indicate failure of the real time data transfer.

19. The product of claim 18, wherein the request message comprises a read request for a real time IN transfer of data to be delivered from the USB device EP to the USB host, the delivery time comprises a time to complete delivery of the data from the USB device EP to the MA USB host.

20. An apparatus comprising:

a processor comprising logic and circuitry configured to cause a Media-agnostic (MA) Universal Serial Bus (USB) device of an MA USB Protocol Adaptation Layer (PAL) to communicate with an MA USB host of the MA USB PAL, the MA USB PAL to connect between a USB device and a USB host, the processor configured to cause the MA USB device to:

receive at least one real time transfer request from the MA USB host, the real time transfer request to request a real time data transfer to be delivered between the USB host and a USB device endpoint (EP) corresponding to the USB device, a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a real time transfer response to the MA USB host, the real time transfer response comprising an error indication to indicate that the real time data transfer cannot be completed by the delivery time; and a memory to store information processed by the processor.

21. The apparatus of claim 20, wherein the real time transfer request comprises a request for a real time IN transfer of data to be delivered from the USB device EP to the USB host, the delivery time comprises a time to complete delivery of the data from the USB device EP to the MA USB host.

22. The apparatus of claim 21 configured to cause the MA USB device to transmit to the MA USB host one or more real time transfer responses comprising at least part of the data of the real time IN transfer, a header of the one or more real time transfer responses comprising the request ID field, a delivery time field in the header of the one or more real time transfer responses comprising an actual delivery time of a last payload byte from the USB device EP.

23. The apparatus of claim 20, wherein the real time transfer request comprises a request for a real time OUT transfer of data to be delivered from the USB host to the USB device EP, the delivery time comprises a time to complete delivery of the data from the USB host to the USB device EP.

24. A product comprising one or more tangible computer-readable non-transitory storage media comprising computer-executable instructions operable to, when executed by at least one processor, enable the at least one processor to cause a Media-agnostic (MA) Universal Serial Bus (USB) device of an MA USB Protocol Adaptation Layer (PAL) to communicate with an MA USB host of the MA USB PAL, the MA USB PAL to connect between a USB device and a USB host, the instructions, when executed, cause the MA USB device to:

receive at least one real time transfer request from the MA USB host, the real time transfer request to request a real time data transfer to be delivered between the USB host and a USB device endpoint (EP) corresponding to the USB device, a header of the real time transfer request comprising a request Identifier (ID) field to identify the real time data transfer, and a delivery time field to indicate a delivery time to complete delivery of the real time data transfer; and based on a determination that the real time data transfer is not to be completed by the delivery time, send a real time transfer response to the MA USB host, the real time transfer response comprising an error indication to indicate that the real time data transfer cannot be completed by the delivery time.

25. The product of claim 24, wherein the instructions, when executed, cause the MA USB device to include a real time bulk capability indication in an MA USB capability response to the MA USB host, the real time bulk capability indication to indicate support of real time bulk transfers.

* * * * *